(12) United States Patent
Protheroe et al.

(10) Patent No.: US 8,073,738 B2
(45) Date of Patent: Dec. 6, 2011

(54) SYSTEM AND METHOD FOR BROKERING THE SALE OF INTERNET ADVERTISEMENT INVENTORY AS DISCRETE TRAFFIC BLOCKS OF SEGMENTED INTERNET TRAFFIC

(75) Inventors: Robert Llewellyn Protheroe, Falls Church, VA (US); Sung Hyun Shin, Germantown, MD (US); Wesley Edward Eugene Swogger, Fairfax Station, VA (US); Robert William Thomson, Jr., Leesburg, VA (US); Mark Edward Kahn, New York, NY (US); Dean Craig Vegliante, New York, NY (US); Jay Phillip Hirschson, New York, NY (US); Brian James McNamee, Harrington Park, NJ (US); Jarod Reed Caporino, River Edge, NJ (US); Daniel Jeffrey Ballister, New York, NY (US); Scott David Reinke, Brick, NJ (US)

(73) Assignee: TRAFFIQ, Inc., New York, NY (US)

( * ) Notice: Subject to any disclaimer, the term of this patent is extended or adjusted under 35 U.S.C. 154(b) by 1043 days.

(21) Appl. No.: 11/893,976

(22) Filed: Aug. 18, 2007

(65) Prior Publication Data
US 2008/0275777 A1 Nov. 6, 2008

Related U.S. Application Data

(60) Provisional application No. 60/915,433, filed on May 1, 2007.

(51) Int. Cl.
*G06Q 30/00* (2006.01)
(52) U.S. Cl. .................................. 705/14.69
(58) Field of Classification Search ............... 705/14.69, 705/14
See application file for complete search history.

(56) References Cited

U.S. PATENT DOCUMENTS
2002/0010623 A1\* 1/2002 McCollom et al. ............. 705/14
(Continued)

OTHER PUBLICATIONS

Chang, Julia. "The World According to Google," Sales & Marketing Management, Apr. 2006.\*

(Continued)

*Primary Examiner* — Michelle Tarae
(74) *Attorney, Agent, or Firm* — SNR Denton US LLP

(57) ABSTRACT

An auction management system brokers, between a seller and a buyer, a discrete traffic block of an ad placement. The auction management system comprises a traffic block definition tool providing workflows for obtaining traffic block parameters defining the discrete traffic block, the traffic block parameters comprising: i) an identification of the ad placement; ii) a volume parameter defining the volume of traffic included in the discrete traffic block; iii) at least one duration parameter defining an active time period during which the volume of traffic included in the discrete traffic block will be provided; and iv) an auction parameter defining an expiration time before which buyers submit offers to purchase the discrete traffic block. A listing search tool provides web pages displaying a listing of a plurality of listed discrete traffic blocks. Each listed discrete traffic block comprises a discrete traffic block with an expiration time that has not yet passed. The listing includes, for each listed discrete traffic block, the traffic block parameters associated therewith. An auction management tool provides for: i) obtaining a buyer compensation parameter from each of a plurality of buyers bidding for purchase of the discrete traffic block; and ii) designating the buyer that that provided a compensation parameter meeting selection criteria as the winning buyer. An order management system directs placement of buyer advertisement content designated by the winning bidder within the ad placement for the volume of traffic defined by the volume parameter and during the time period defined by the at least one duration parameter.

7 Claims, 28 Drawing Sheets

U.S. PATENT DOCUMENTS

| | | | |
|---|---|---|---|
| 2002/0128904 A1* | 9/2002 | Carruthers et al. | 705/14 |
| 2002/0194215 A1* | 12/2002 | Cantrell et al. | 707/500 |
| 2003/0171990 A1* | 9/2003 | Rao et al. | 705/14 |
| 2005/0027594 A1 | 2/2005 | Yasnovsky | |
| 2005/0216547 A1 | 9/2005 | Foltz-Smith | |
| 2006/0080171 A1* | 4/2006 | Jardins et al. | 705/14 |
| 2007/0027762 A1* | 2/2007 | Collins et al. | 705/14 |
| 2007/0174114 A1* | 7/2007 | Bigby et al. | 705/14 |
| 2007/0244760 A1* | 10/2007 | Bodnar et al. | 705/14 |
| 2007/0271145 A1* | 11/2007 | Vest | 705/14 |

OTHER PUBLICATIONS

Grimshaw, Colin. "Place your bids," Revolution, Apr. 2004.*

Kitts et al. "Click Fraud," Bulletin of the American Society for Information Science & Technology, Dec. 2005/Jan. 2006.*

"Marchex Acquires IndustryBrains, a Provider of Highly Targeted Online Traffic and Contextual Advertising Solutions," Business Wire, Jul. 27, 2005.*

* cited by examiner

| Attribute Library 70 | |
|---|---|
| INDX | Attribute Description 72 |
| 1 | US |
| 2 | UK |
| ... | ... |
| 10 | New England (MA, RI, NH, VT, ME) |
| 11 | Mid-Atlantic |
| 12 | South East |
| 13 | Mid-West |
| 14 | Mountain |
| 16 | South West |
| 17 | North West |
| ... | ... |
| 100 | Male |
| 101 | Female |
| 102 | < 18 |
| 103 | 18 - 30 |
| 104 | 30 - 40 |
| 105 | 40 - 50 |
| 106 | 50 + |
| ... | ... |
| 207 | Income < 30K |
| 208 | Income 30 - 60K |
| 209 | Income 60 - 100K |
| 210 | Income 100K - 250K |
| 211 | Income 250K + |
| ... | ... |

Figure 4

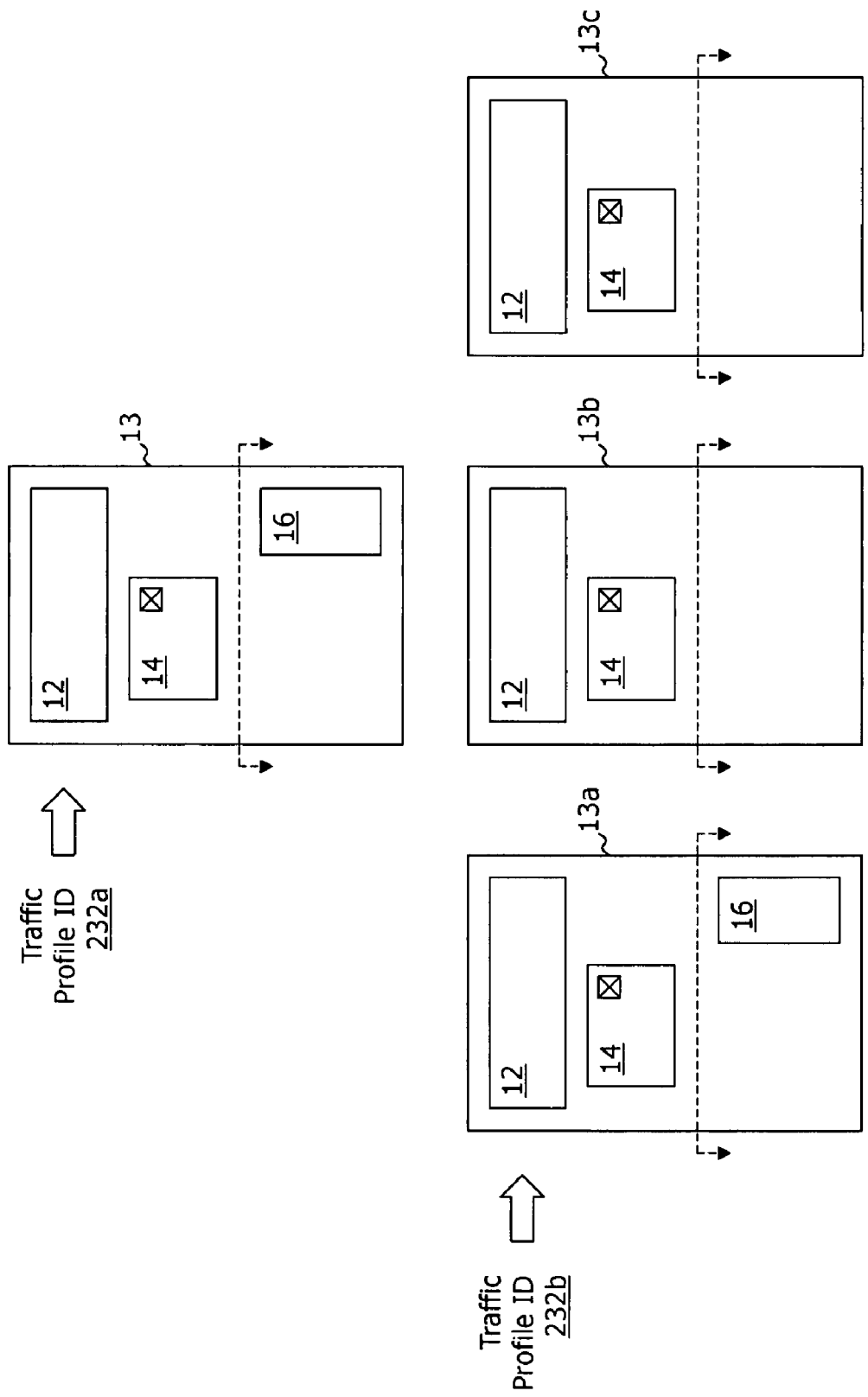

| Traffic Template 76 | | Seg. 11a | Seg. 11b | Seg. 11c | Seg. 11d | Seg. 11e | Seg. 11f | Seg. 11g |
|---|---|---|---|---|---|---|---|---|
| Bit Location | Attribute 80 | TABP 28a | TABP 28b | TABP 28c | TABP 28d | TABP 28e | TABP 28f | TABP 28g |
| 1 | US | X | X | X | X | X | X | |
| 2 | New England (RI, MA, NH, VT, ME) | X | | | | | | |
| 3 | Mid-Atlantic | | X | | | | | |
| 4 | South East | | | X | | | | |
| 5 | Mid-West | | | | X | | | |
| 6 | Mountain | | | | | X | | |
| 7 | South West | | | | | | X | |
| 8 | North West | | | | | | | |

Figure 5b

| Traffic Template 76 | | | | | | | |
|---|---|---|---|---|---|---|---|
| | | Seg. 11a | Seg. 11b | Seg. 11c | Seg. 11d | Seg. 11e | Seg. 11f |
| Bit Location | Attribute 80 | TABP 28a | TABP 28b | TABP 28c | TABP 28d | TABP 28e | TABP 28f |
| 1 | Male | | X | X | X | X | X |
| 2 | Female | X | | | | | |
| 3 | < 18 | | X | | | | |
| 4 | 18 - 30 | | | X | | | |
| 5 | 30 - 40 | | | | X | | |
| 6 | 40 - 50 | | | | | X | |
| 7 | 50 + | | | | | | X |

Figure 5c

Seller ID 86

Ad Placement 15

| ID | Size 88 | Position 90 | TPID 232 |
|----|---------|-------------|----------|
| 12 |         |             |          |
| 14 |         |             |          |
| 16 |         |             |          |

Inventory 92

| ID | Placement | Segment Group | Inventory Statistics 94 |
|-----|-----------|---------------|-------------------------|
| 93a | 12 | 11a | |
| 93b | 12 | 11b | |
| 93c | 12 | 11c | |
| 93d | 14 | 11a,b,c | |
| 93e | 16 | 11a,b,c | |

Discrete Traffic Block Table 98

| DTB ID | Duration 96 | | Volume 98 | | Status 102 | Auction | | Fulfillment 104 | | Group ID 106 |
|--------|-------------|---|-----------|---|------------|---------|---|----------------|---|--------------|
| | Start 96a | End 96b | Click 98a | Imp. 98b | | Start Time 103a | End Time 103b | Click 104a | Imp. 104b | |
| 20c | 1 June 07 | 5 June 07 | 500 | 500 | Open | | | 500 | 500 | |
| 20d | 3 June 07 | 7 June 07 | | | Open | | | | | |
| 20e | 5 June 07 | 9 June 07 | 1000 | 1000 | Unsold | | | | 1000 | |

Figure 7b

| Inventory Report 376 | | | | | |
|---|---|---|---|---|---|
| Date 378 | Delivered Orders 380 (thousands) | On Order (undelivered) 382 (thousands) | Committed Inventory 384 (thousands) | Listed, Not Yet Committed 386 (thousands) | Projected Unsold 388 (thousands) |
| 07/07/2007 | 0 | 1,071 | 0 | 0 | 595 |
| 08/07/2007 | 0 | 1,071 | 0 | 0 | 595 |
| 09/07/2007 | 0 | 1,071 | 0 | 0 | 595 |
| 10/07/2007 | 0 | 1,071 | 0 | 0 | 595 |
| 11/07/2007 | 0 | 1,071 | 0 | 0 | 595 |
| 12/07/2007 | 0 | 1,071 | 0 | 0 | 595 |
| 13/07/2007 | 0 | 1,071 | 0 | 0 | 595 |
| 14/07/2007 | 0 | 1,071 | 0 | 71 | 524 |
| 15/07/2007 | 0 | 1,071 | 0 | 71 | 524 |
| 16/07/2007 | 0 | 1,071 | 0 | 71 | 524 |
| 17/07/2007 | 0 | 1,071 | 0 | 71 | 524 |
| 18/07/2007 | 0 | 1,071 | 0 | 71 | 524 |
| 19/07/2007 | 0 | 1,071 | 0 | 71 | 524 |
| 20/07/2007 | 0 | 1,071 | 0 | 71 | 524 |
| 21/07/2007 | 0 | 1,071 | 0 | 71 | 524 |
| Totals | 0 | 16,065 | 0 | 568 | 8,357 |
| Averages | 0 | 1,071 | 0 | 38 | 557 |

Figure 10b

Branding / Logolink to Main Home

| Dashboard | Listings | Research | My Account | | Log In to Buyer Account | Log Out | Help |

Selling Activity | Manage Ad Placement | Reports | Message Center | Traffice Profile Wizard Welcome [username]

| Listings | Orders |

Active Listings | Pending Listings | Expired Listings

Create New Listing ～282

| Ad Placement | Traffic | Contract Start/End | Current Top Bid | # of Bids/ Watchers | Auction Time Remaining |
|---|---|---|---|---|---|
| URL: http://www.wonderfulworld.com/home.html | | | | | |
| Listing Name 1 Ad Placement 1 | 1,000 Clicks° (Traffice Segment Group 1) | 5/1/07-5/8/07 | $10,000° Username/Rating | 11/43 | 30 min. ▶ |
| Listing Name 2 Ad Placement 1 | 1,000 Clicks° (Traffice Segment Group 1) | 5/1/07-5/8/07 | $10,000° Username/Rating | 12/53 | 33 min. ▶ |
| URL: http://www.wonderfulworld.com/events.html | | | | | |
| Listing Name 3 Ad Placement 1 | 1,000 Clicks° (Traffice Segment Group 1) | 5/1/07-5/8/07 | $10,000° Username/Rating | 14/43 | 3 hours ▶ |
| Listing Name 4 Ad Placement 1 | 1,000 Clicks° (Traffice Segment Group 1) | 5/1/07-5/8/07 | $10,000° Username/Rating | 11/44 | 30min ▶ |

Discrete Traffic Block Table 98

| DBT ID | Duration 96 | | Volume 98 | | Status 102 | End Time 103 | Fulfillment 104 | | Group ID 106 |
|---|---|---|---|---|---|---|---|---|---|
| | Start 96a | End 96b | Click 98a | Imp. 98b | | | Click 104a | Imp. 104b | |
| 20c | 1 June 07 | 5 June 07 | | 500 | Open | | | 500 | |
| 20d | 3 June 07 | 7 June 07 | 500 | | Open | | 500 | | |
| 20e | 5 June 07 | 9 June 07 | | 1000 | Unsold | | | 1000 | |

Bid Table 110

| Buyer ID 34 | Content ID 19 | Raw Bid 112 | Click eCPM 114 | Content and Website 114d |
|---|---|---|---|---|
| | | | | |
| | | | | |
| | | | | |

Filler Bid Table 116

| Buyer ID 34 | Content ID 19 | Bid 118 | Expired Time 120 |
|---|---|---|---|
| | | | |
| | | | |
| | | | |

Figure 14

Campaign Table 134

| INDX | Campaign ID 138 | Group ID 34 | Target Duration 140 | | Target Volume 142 | | Budget 145 | Delivery Media Objectives 145 | Purchased Volume 146 | | Fulfillment 148 | | RFL Option 302 | Response Deadline 304 | Open Offer Date 306 |
|---|---|---|---|---|---|---|---|---|---|---|---|---|---|---|---|
| | | | Start | End | Imp | Click | | | Imp | Click | Imp | Click | | | |
| | | | | | | | | | | | | | | | |
| | | | | | | | | | | | | | | | |

300 spans: RFL Option 302, Response Deadline 304, Open Offer Date 306

136 brackets the data rows

RFL Response Table 310

| INDX | Seller ID 313 | Inventory ID 314 | Duration 316 | | Volume 318 | | Quote 319 | Accept / Reject 320 |
|---|---|---|---|---|---|---|---|---|
| | | | Start 316a | End 316b | Imp 318a | Click 318b | | |
| | | | | | | | | |
| | | | | | | | | |

312 brackets the data rows

Figure 15

| Dashboard | Listings | IQ | My Account | |
|---|---|---|---|---|
| Selling Activity \| Manage Ad Placement \| Reports \| Message Center \| Traffice Profile Wizard |||||

Branding / Logolink to Main Home

Log In to Buyer Account | Log Out | Help

| Match 340 | RFL End Date 341 | |
|---|---|---|
| 89% | 5/15/2007 | Campaign Start/End: 5/15/07 - 7/1/07<br>Traffic Requested: 1,000,000 Impressions<br>Campaign ID: 123450<br>342 — Request More Information<br>344 — Respond |
| 82% | 5/15/2007 | Campaign Start/End: 6/15/07 - 7/1/07<br>Traffic Requested: 2,000,000 Impressions<br>Campaign ID: 123450<br>342 — Request More Information<br>344 — Respond |
| 79% | 5/15/2007 | Campaign Start/End: 6/15/07 - 7/1/07<br>Traffic Requested: 1,000 Clicks<br>Campaign ID: 123450<br>342 — Request More Information<br>344 — Respond |

$$Y_{fao} = \frac{\text{Total Clicks on Ad Content - within Traffic Segment}}{\text{Total Impressions - All Traffic Segment}}$$

Figure 22a $$Y_{fa} = \frac{\text{Total Clicks on Ad Content - All Traffic Segment Placements}}{\text{Total Impressions - All Traffic Segment Placements}}$$

Figure 22b $$Y_{fco} = \frac{\text{Total Clicks - All Content within Campaign within Traffic Segment}}{\text{Total Impressions - All Content within Campaign within Traffic Segment}}$$

Figure 22c $$Y_{fc} = \frac{\text{Total Clicks - All Ad Content within Campaign}}{\text{Total Impressions - All Ad Content within Campaign}}$$

Figure 22d

SYSTEM AND METHOD FOR BROKERING THE SALE OF INTERNET ADVERTISEMENT INVENTORY AS DISCRETE TRAFFIC BLOCKS OF SEGMENTED INTERNET TRAFFIC

TECHNICAL FIELD

The present invention relates to a network based auction system and method for brokering, between a seller and a buyer, the sale of Internet advertisement inventory as a discrete traffic block of segmented Internet traffic and, more particularly to a system and method for facilitating seller segmentation of its Internet traffic, definition of a discrete traffic block, buyer selection thereof, and advertisement impression delivery in response to a buyer purchase of thereof.

BACKGROUND OF THE INVENTION

Users of the Internet are frequently presented with display advertisements within web pages. These advertisements may be in the form of banner advertisements, pop up ads, pop under ads, or other static or dynamic display advertisements within (or associated with) a web publisher's web site.

The goal of each these advertisements is to entice the user to link to the advertiser's web site for additional information and/or ultimately to solicit the sale of a product or service to the user. As such, displayed advertisements may be associated with a link such that if the advertisement is clicked, the user's web browser is redirected to the advertiser's designated web page.

Because of the above described dynamics of Internet advertising, certain terminology has evolved in the Internet advertising industry. For example: i) the event of rendering an advertisement to an end user within a web publisher's web site is generally referred to as an advertisement impression; ii) the event of a user selecting an advertisement, or clicking on the advertisement, such that his/her browser is redirected to the advertiser's website is generally referred to as a "click" or "click-through"; iii) web publishers may be referred to as sellers of advertisement space, sellers of Internet traffic, or sellers; iv) advertisers may be referred to as buyers; v) the quantity of impressions that a web publisher is able to deliver during a period of time may be referred to as its inventory or inventory of Internet traffic, or traffic available for buyers to purchase; and vi) the distinct portions of a web publisher's inventory that can be delivered to end users distinguishable based on end user attributes such as geography, demographics, and/or behavioral patterns may be referred to as segmented inventory or traffic segments.

For example, a web publisher which has traffic of 10,000 "hits" per day has the ability to deliver 10,000 banner advertisements per day. Therefore the publisher has an inventory of 10,000 banner advertisement impressions per day which can be sold.

Further, if the impression is delivered on a web page where user registration is required to access the web page, and such registration requires the user to disclose his/her gender, then the inventory of 10,000 banner advertisements can be segmented into a male segment and a female segment. If, on average, the 10,000 hits are 50% male and 50% female, the publisher has segmented inventory of 5,000 banner advertisement impressions per day as its male traffic segment and 5,000 banner advertisement impressions per day as its female traffic segment.

Advertisement inventory is generally priced and sold utilizing transactional units based on a per-impression transactional model or on a per-click transactional model. An advertiser purchasing placement within a web site utilizing the per-impression transactional model will pay a fee to the publisher (or a broker) that is calculated based on the quantity of impressions rendered. An advertiser purchasing placement within a web site utilizing the per-click transactional model will pay a fee to the publisher (or a broker) calculated on the number of end users that "click through" the advertisement impression to the advertiser's website.

In more detail, the most common transactional units are Cost-Per-Thousand-Impressions (CPM) and Cost-Per-Click (CPC). Other transactional units which require at least user interaction with the advertisement impression and click through to the advertiser's web site include Cost-Per-Lead (CPL), Cost-Per-Acquisition/Action (CPA).

Website owners generally sell their inventory utilizing one of two dominant business models. The first dominant business model includes a buyer initiating a request for proposal (RFP) process. The buyer's RFP may describe the advertising campaign in terms of its overall objectives for advertising a particular product or service over a distinct period of time. Further, the RFP may typically specify proposed sales goals, conversion goals and branding goals, and target user attributes likely to improve the campaigns success. As is typical of any RFP process, the buyer will distribute the RFP, particularly to those web publishers (or brokers) known to have inventory, or segmented inventory, suited to meet the goals and objectives of the campaign.

Each seller receiving the RFP may determine whether it has available inventory, or segmented inventory that meets the buyer's stated goals. If a seller has available inventory, or segmented inventory, that meets the stated goals in the RFP, the seller may submit a proposal for the delivery of inventory that meets all or part of the buyer's volume requirements. The proposal typically is a firm offer that remains open for the buyer to accept during a defined period of time.

The buyer then reviews those submitted proposals and selects/accepts those responses that the buyer determines provide the inventory most suitable for meeting the campaign objectives.

The second dominant business model includes use of an ad network. An ad network aggregates web publishers with available inventory and sells such inventory to buyers—which it also aggregates. Such inventory is often sold in a continuous auction meaning that an available impression may be sold, at least in part, to the advertiser with the highest yielding advertisement (e.g. the highest remuneration expected to be received for the lowest quantity of inventory to be delivered at such time as the impression is to be rendered to the end user viewing the publisher's web page.

For example, an ad network may categorize the web sites of several publishers within a topical category for purposes of defining available inventory associated with such topic. Advertisers would then place bids associated with such topic. As such, so long as the advertiser remains the highest bidder for such topical category, its advertisement content will be rendered over that of other advertisers placing lower bids. Further, the highest bidder may be determined utilizing relative yield between multiple bids.

The primary advantage of the RFP process is that the advertiser maintains control over: i) in which web publisher's websites its advertisement content appears; and ii) to which end user segments its advertisement content is rendered. This control enables buyers to select what it perceives to be the highest value inventory, or inventory segments, and makes it economically feasible for the buyer to pay a premium for such highest value inventory, or inventory segments.

An advertiser purchasing inventory through an ad network may only control the topical category on which the advertiser is bidding—but limited control over which web publisher's websites within the topical category will deliver its advertisement content to end users—and little control over the end user segments to which its advertisement content will be delivered.

As such, from the perspective of an advertiser, inventory purchased through an ad network is generally "less targeted" than inventory purchased through the RFP method because the ad network inventory is defined by the ad network categorization—not the buyer's campaign specific objectives. Therefore, from the perspective of an advertiser, the inventory within the topical category likely contains a composition of inventory that the advertiser would perceive as high value inventory and inventory that the advertiser would prefer not to purchase. A rational advertiser considers these factors when purchasing through and ad network and will therefore typically pay less per impression or per click per other action performed for such less targeted inventory.

Further yet, because ad networks often operate in an auction environment that is continuous, there is little predictability as to the quantity of impressions that will be delivered on a certain budget—as a buyer may be outbid at any time.

There are also disadvantages of use of an ad network from the seller's perspective. Because the seller's inventory is aggregated with inventory of other sellers within a topical category—and is generally purchased as a composition by a buyer, it is difficult for a seller to promote the value of its website or its traffic, or traffic segments, over other sellers within the topical category. As such, it may be difficult for a seller to realize the maximum value of the traffic, or traffic segments, that it could deliver on a more targeted basis.

Secondly, because of the continuous auction system, there is little predictability of the revenue a seller will receive for delivering inventory through the ad network—or even if there will be buyer bidding any minimum price at the time the seller is to deliver an impression—leaving what may be referred to as unsold inventory.

On the other hand, some disadvantages of the RFP process include the fact that the entire RFP process is very time consuming and labor intensive process for all parties. The RFP process also fails to create a true open-market environment for the sale and purchase of inventory because: i) buyers are limited in their available options for the purchase of inventory by the RFPs it sends out; and ii) sellers are limited in their opportunities to sell their available inventory to RFPs received and the efforts of its sales staff to directly sell their inventory to buyers, which may or may not result in the initiation of the RFP process, outlined above. As such, there are transaction and/or pricing inefficiencies that are mitigated in the Internet based open market created by an ad network.

In view of the foregoing, what is needed is a system and method for brokering the sale of Internet advertisement inventory as a discrete traffic block of segmented inventory in a manner that does not suffer the disadvantage of the present business models used for selling/purchasing Internet advertising inventory.

SUMMARY OF THE INVENTION

A first aspect of the present invention comprises an auction management system for brokering, between a seller and a buyer, a discrete traffic block of an ad placement.

The auction management system comprises a traffic block definition tool providing workflows for obtaining traffic block parameters defining the discrete traffic block. The traffic block parameters comprises: i) identification of the ad placement; ii) a volume parameter defining the volume of traffic included in the discrete traffic block; iii) at least one duration parameter defining an active time period during which the volume of traffic included in the discrete traffic block will be provided; and iv) an auction parameter defining an expiration time before which buyers may submit offers to purchase of the discrete traffic block.

A listing search tool provides web pages displaying a listing of a plurality of listed discrete traffic blocks, each listed discrete traffic block comprises a discrete traffic block with an expiration time that has not yet passed. The listing includes, for each listed discrete traffic block, the traffic block parameters associated therewith.

An auction management tool provides for: i) obtaining a buyer compensation parameter obtained from each of a plurality of buyers submitting offers to purchase the discrete traffic block; and iii) designating the buyer that provided a compensation parameter meeting selection criteria as the winning buyer.

An order management system directs placement of buyer advertisement content designated by the winning bidder within the advertisement placement for the volume of traffic defined by the volume parameter and during the time period defined by duration parameter.

In one embodiment, the order management system further directs placement of filler advertisement content within the ad placement if placement of advertising content designated by the winning bidder is at a fulfillment pace that is ahead of a fulfillment pace threshold.

In one sub-embodiment the volume of traffic as defined by the volume parameter may be a predetermined quantity of advertisement impressions displayed to end users. The fulfillment pace may be the aggregate of advertisement impressions displayed to the end users.

The fulfillment pace threshold may be the total quantity of advertisement impressions included within the discrete block divided by the active time period of the discrete block and multiplied by the portion of the active time period that has elapsed.

Alternatively, the fulfillment pace threshold may be a high fulfillment threshold. The high fulfillment threshold may be: i) the total quantity of advertisement impressions included within the discrete block divided by the active time period of the discrete block and multiplied by the portion of the active time period that has elapsed, plus ii) a predetermined high threshold value divided by the active time period of the discrete block and multiplied by an amount of time remaining before expiration of the active time period.

In another sub embodiment the volume of traffic as defined by the volume parameter may be a predetermined quantity of clicks, with a click representing an end user, to which an advertisement impression is displayed, selecting the advertisement impression for redirect to a web page designated by the buyer. The fulfillment pace may be the aggregate quantity of clicks.

The fulfillment pace threshold may be the total quantity of clicks included within the discrete block divided by the active time period of the discrete block and multiplied by the portion of the active time period that has elapsed.

Alternatively, the fulfillment pace threshold may be a high fulfillment threshold. The high fulfillment threshold may be: i) the total quantity of clicks included within the discrete block divided by the active time period of the discrete block and multiplied by the portion of the active time period that has elapsed, plus ii) a predetermined high threshold value divided by the active time period of the discrete block and multiplied by an amount of time remaining before expiration of the active time period.

In a second embodiment, at least two discrete traffic blocks may include concurrent active time periods. The order management system may direct placement of buyer advertisement content designated by the winning bidder within the ad placement for the discrete traffic block that is most behind a fulfillment pace threshold.

For each of the at least two discrete traffic blocks the fulfillment pace for the discrete traffic block may be the aggregate of volume fulfilled. The fulfillment pace threshold for the discrete traffic block may be the total volume of traffic included in the discrete traffic block divided by the active time period of the discrete traffic block and multiplied by the portion of the active time period that has elapsed.

In one sub embodiment the fulfillment pace threshold may be a low fulfillment threshold. The low fulfillment threshold may be: i) the total volume included within the discrete block divided by the active time period of the discrete block and multiplied by the portion of the active time period that has elapsed, less ii) a predetermined low threshold value divided by the active time period of the discrete block and multiplied by an amount of time remaining before expiration of the active time period.

In a third embodiment, the traffic block parameters may further comprise a segment parameter. The segment parameter may define at least one attribute comprising. The at least one attribute may be a geographic, demographic, behavioral, psychographic, or other attribute.

In this embodiment, the order management system: i) receives an attribute profile about the end user to which an advertisement impression is to be displayed, the attribute profile defining at least one of a geographic, demographic, or behavioral attribute of such end user; and ii) directs placement of, as the advertisement impression, buyer advertisement content designated by the winning bidder within the ad placement for the volume of traffic defined by the volume parameter, during the active time period of the discrete traffic block defined by the duration parameter, and for which the attribute profile of the end user matches the at least one attribute defined by the segment parameter.

In a fourth embodiment, the auction management system may further include a campaign configuration tool providing a work flow for obtaining campaign parameters defining the buyer's advertisement campaign. The campaign parameters may comprise at least one target traffic attribute defining at least one of geographic, demographic, or behavioral data of end users to which the buyer desires the buyer advertisement content to be rendered. In this embodiment, the listing tool further displays an indication of match between the at least one attribute defined by the segment parameter and the at least one target traffic attribute.

In a fifth embodiment, the traffic block parameters further comprise a buyer group parameter, the buyer group parameter defining a plurality of private buyers. In this embodiment, the listing search tool includes the discrete traffic block within the display of active traffic blocks only if the buyer is a one of the plurality of private buyers.

In a sixth embodiment, the compensation parameter may be a yield weighted bid. The yield weighted bid may comprise a buyer's raw bid divided by the expected number of impressions required to provide the predetermined quantity of clicks.

The expected number of impressions required to provide the predetermined quantity of clicks comprises the predetermined quantity of clicks divided by a yield factor.

In one embodiment, the yield factor may comprise a value calculated by dividing a historical quantity of clicks on the advertisement content over a predetermined period of time by the quantity of impressions of the advertisement content over the predetermined period of time.

In another embodiment, the yield factor may comprise a value calculated by dividing a historical quantity of clicks on the advertisement content within the discrete traffic block over a predetermined period of time by the quantity of impressions of the advertisement content within the discrete traffic block over the predetermined period of time.

A second aspect of the present invention comprises a listing system for brokering, between a seller and a buyer, a discrete traffic block of an ad placement. The listing system may comprise a request for listing tool providing web pages to a buyer for obtaining campaign parameters defining the buyer's advertising campaign. The campaign parameters may comprise: i) at least one target traffic attribute defining at least one attribute of a target discrete traffic block in which the buyer desires buyer advertisement content to be rendered; and ii) a target duration parameter defining a time period during which the buyer desires to have buyer advertisement content rendered.

A listing response tool provides web pages to a seller for displaying the campaign parameters for at least one open request for listing and obtaining traffic block parameters associated with a seller proposed discrete traffic block.

The traffic block parameters may comprise: i) a volume parameter defining the volume of traffic included in the discrete traffic block; and ii) at least one duration parameter defining a time period during which the volume of traffic included in the discrete traffic block will be delivered.

The request for listing tool may further provide web pages to the buyer for: i) displaying the traffic block parameters associated with each proposed discrete traffic block; and ii) obtaining selection of at least one selected traffic block, the at least one selected traffic block being a one of the proposed discrete traffic blocks.

An order management system directs placement of buyer advertisement content designated by the buyer within an ad placement of the at least one selected traffic block for the volume of traffic defined by the volume parameter and during the time period defined by the duration parameter.

In one embodiment of this second aspect, the volume of traffic defined by the volume parameter may be a predetermined quantity of advertisement impressions displayed to end users. The order management system may further placement of filler advertisement content within the ad placement if placement of the advertising content designated by buyer is at a fulfillment pace that is ahead of a fulfillment pace threshold. The fulfillment pace is the aggregate of advertisement impressions displayed to the end users.

In one sub embodiment the fulfillment pace threshold is the total quantity of advertisement impressions included within the discrete block divided by the active time period of the discrete block and multiplied by the portion of the active time period that has elapsed.

In an alternative sub embodiment the fulfillment pace threshold is a high fulfillment threshold. The high fulfillment threshold may be: i) the total quantity of advertisement impressions included within the discrete block divided by the active time period of the discrete block and multiplied by the portion of the active time period that has elapsed, plus ii) a predetermined high threshold value divided by the active time period of the discrete block and multiplied by an amount of time remaining before expiration of the active time period.

In a second embodiment of this second aspect, the volume of traffic defined by the volume parameter may be a predetermined quantity clicks and wherein a click represents an end user, to which an advertisement impression is displayed, selecting the advertisement impression for redirect to a web page designated by the buyer. In this second embodiment, the fulfillment pace is the aggregate quantity of clicks.

In one sub embodiment, the fulfillment pace threshold is the total quantity of clicks included within the discrete block divided by the active time period of the discrete block and multiplied by the portion of the active time period that has elapsed.

In an alternative sub embodiment, the fulfillment pace threshold is a high fulfillment threshold. The high fulfillment threshold may be: i) the total quantity of clicks included within the discrete block divided by the active time period of the discrete block and multiplied by the portion of the active time period that has elapsed, plus ii) a predetermined high threshold value divided by the active time period of the discrete block and multiplied by an amount of time remaining before expiration of the active time period.

For a better understanding of the present invention, together with other and further aspects thereof, reference is made to the following description, taken in conjunction with the accompanying drawings. The scope of the present invention is set forth in the appended claims.

BRIEF DESCRIPTION OF THE DRAWINGS

FIG. 4 is a table representing a global attribute library in accordance with an exemplary embodiment of the present invention;

FIG. 5a represents definition of traffic profiles for groups of one or more web pages in accordance with an exemplary embodiment of the present invention;

FIG. 5b is a table representing a first traffic template for segmenting a publisher's Internet traffic in accordance with an exemplary embodiment of the present invention;

FIG. 5c is a table representing a second traffic template for segmenting a publisher's Internet traffic in accordance with an exemplary embodiment of the present invention;

FIG. 7b is a diagram representing relational structures between data associated with a seller's ad placements, segmentation therefore, and sale thereof as discrete traffic blocks in accordance with an embodiment of the present invention;

FIG. 10b is a web page diagram representing a first embodiment of an inventory report in accordance with an exemplary embodiment of the present invention;

FIG. 10d is a web page diagram representing exemplary work flow for managing discrete traffic block listings in accordance with an exemplary embodiment of the present invention;

FIG. 13 is a web page diagram representing an exemplary listing of discrete traffic blocks corresponding to objectives of a buyer's campaign in accordance with an embodiment of the present invention;

FIG. 14 is a diagram representing exemplary relational structures between data associated with buyer's bidding on discrete traffic blocks in accordance with an embodiment of the present invention;

FIG. 15 is a diagram representing exemplary relational structures between data associated with a buyer generating a request for listings and a seller's response thereto in accordance with an embodiment of the present invention;

FIG. 17 is a web page diagram representing an exemplary display of request for listings matching a seller's segmented traffic in accordance with an embodiment of the present invention;

FIG. 18 is a web page diagram representing an exemplary work flow for responding to a request for listing in accordance with an embodiment of the present invention;

FIG. 22a represents a calculation of a yield factor in accordance with an embodiment of the present invention;

FIG. 22b represents a calculation of a yield factor in accordance with an embodiment of the present invention;

FIG. 22c represents a calculation of a yield factor in accordance with an embodiment of the present invention; and FIG. 22d represents a calculation of a yield factor in accordance with an embodiment of the present invention.

DETAILED DESCRIPTION OF THE EXEMPLARY EMBODIMENTS

Figure 1:
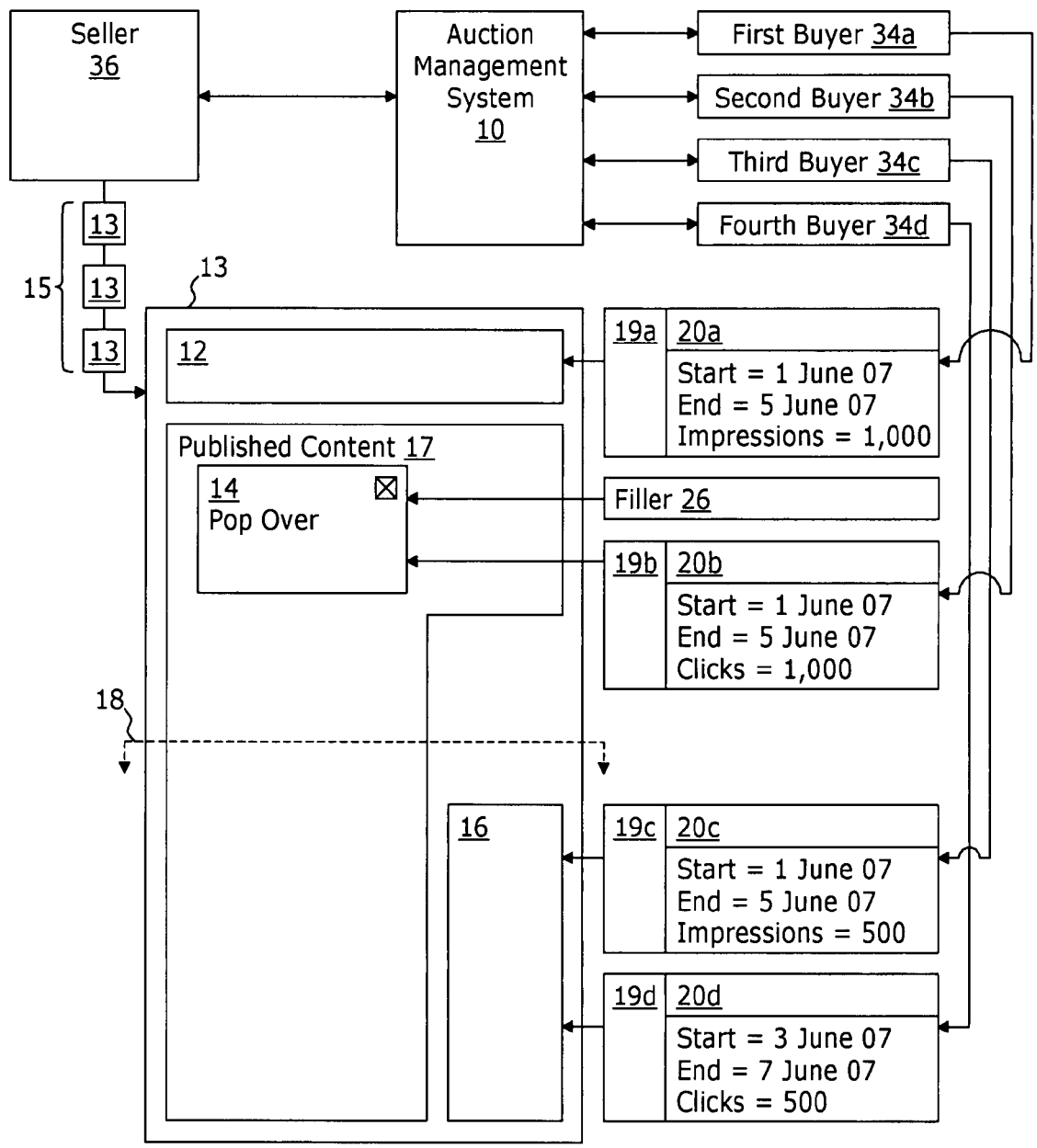
FIG. 1 is a block diagram representing exemplary architecture for implementing a network based auction system and method for brokering the sale of Internet advertisement inventory as discrete traffic blocks in accordance with an embodiment of the present invention.

The present invention will now be described in detail with reference to the drawings. In the drawings, each element with a reference number is similar to other elements with the same reference number independent of any letter designation following the reference number. In the text, a reference number with a specific letter designation following the reference number refers to the specific element with the number and letter designation and a reference number without a specific letter designation refers to all elements with the same reference number independent of any letter designation following the reference number in the drawings.

It should also be appreciated that many of the elements discussed in this specification may be implemented in a hardware circuit(s), a processor executing software code, or a combination of a hardware circuit(s) and a processor or control block of an integrated circuit executing machine readable code. As such, the term circuit, module, server, or other equivalent description of an element as used throughout this specification is intended to encompass a hardware circuit (whether discrete elements or an integrated circuit block), a processor or control block executing code, or a combination of a hardware circuit(s) and a processor and/or control block executing code.

It should also be appreciated that table structures represented in this application are exemplary only and intended to show the mapping of relationships between various data elements. Other table structures may store similar data elements in a manner that maintains the relationships useful for the practice of the present invention.

FIG. 1 represents an auction management system 10 for brokering the placement of advertisement content 19a, 19b, 19c, and 19d within one or more advertisement placements regions (also referred to as ad placements) 12, 14, and 16 respectively within a seller's web page(s) 13.

In more detail, a seller 36 may operate a web server that provides web page(s) 13 to those browser systems of end user's which establish a connection to such web server.

The web page(s) 13 include informational or other published content 17 which attracts or draws the end users to the website of the seller 36. The web page(s) 13 include the exemplary ad placements 12, 14, and 16 into which a buyer's advertisement content 19a, 19b, 19c, and 19d may be rendered.

The exemplary ad placements 12, 14, and 16 within the web page(s) 13 may be combinations of a banner ad placement 12, a pop-up ad placement 14 which displays over the published content 17 until closed by the end user, and other ad placements which are positioned for display on the web page(s) 13 above or below a fold line 18—for example ad placement 16 which is rendered below the fold line 18. The fold line 18 distinguishes the portions of the web page which are visible upon loading by the web browser (e.g. portions above the fold line 18) from portions that are only visible when the end user manually scrolls towards the bottom of the web page 13 (e.g. portions below the fold line 18).

Unlike conventional continuous auction systems, the auction management system 10 brokers the sale of each ad placement 12, 14, and 16 in discrete traffic blocks 20a-20d.

In more detail, the delivery of a web page 13 to each of multiple end users linking to the seller's website 36 may be referred to as Internet traffic or traffic 15. Each discrete traffic block 20a-20d of the traffic 15 may comprise: i) a defined quantity of impressions rendered within the ad placement during a specified duration of time; or ii) a sufficient quantity of impressions rendered within the ad placement to yield a defined quantity of clicks (end user's selecting the advertisement impression to link through to the advertiser's website) during a specified duration of time. In either case, the specified duration may be defined by a specified start time and a specified end time.

For example, first buyer 34a may purchase a discrete traffic block 20a for ad placement 12 which comprises rendering of 1,000 impressions within ad placement 12 between 1 Jun. 2007 and 5 Jun. 2007. Each impression comprises a rendering of advertisement content 19a defined by the first buyer 34a to a unique end user obtaining and viewing the web page 13 in the browser system of the end user.

As a second example, second buyer 34b may purchase a discrete traffic block 20b for ad placement 14 which comprises 1,000 clicks between 1 Jun. 2007 and 5 Jun. 2007. As such, advertisement content 19b defined by the second buyer 34b will be rendered within ad placement 14 for a sufficient quantity of impressions to yield 1,000 clicks between 1 Jun. 2007 and 5 Jun. 2007.

As yet a third example: i) a third buyer 34c may purchase a discrete traffic block 20c for ad placement 16 which comprises rendering of 500 impressions within ad placement 16 between 1 Jun. 2007 and 5 Jun. 2007; and ii) a fourth buyer 34d may purchase a discrete traffic block 20d for ad placement 16 which comprises 1,000 clicks between 3 Jun. 2007 and 7 Jun. 2007.

As such, advertisement content 19c defined by the third buyer 34c is rendered within the ad placement 16 to a unique end user obtaining and viewing the web page 13 between 1 Jun. 2007 and 5 Jun. 2007 and advertisement content 19d defined by the fourth buyer is rendered within the ad placement 16 for a sufficient quantity of impressions to yield 1,000 clicks between 3 Jun. 2007 and 7 Jun. 2007. During the time period between 3 Jun. 2007 and 5 Jun. 2007 when the two discrete traffic blocks overlap, order balancing systems (discussed herein) provide for selection of which advertisement content 19c or 19d to render within the ad placement 16 as an impression to each unique end user.

In all three examples, filler advertisement content 26 may be rendered within the ad placement 12, 14, or 16 as needed if the web site traffic 15 exceeds that needed for delivery of advertisement impressions for each purchased discrete traffic block. A more detailed discussion of filler advertisement content 26 and its placement within a web page 13 is discussed herein.

Figure 2:
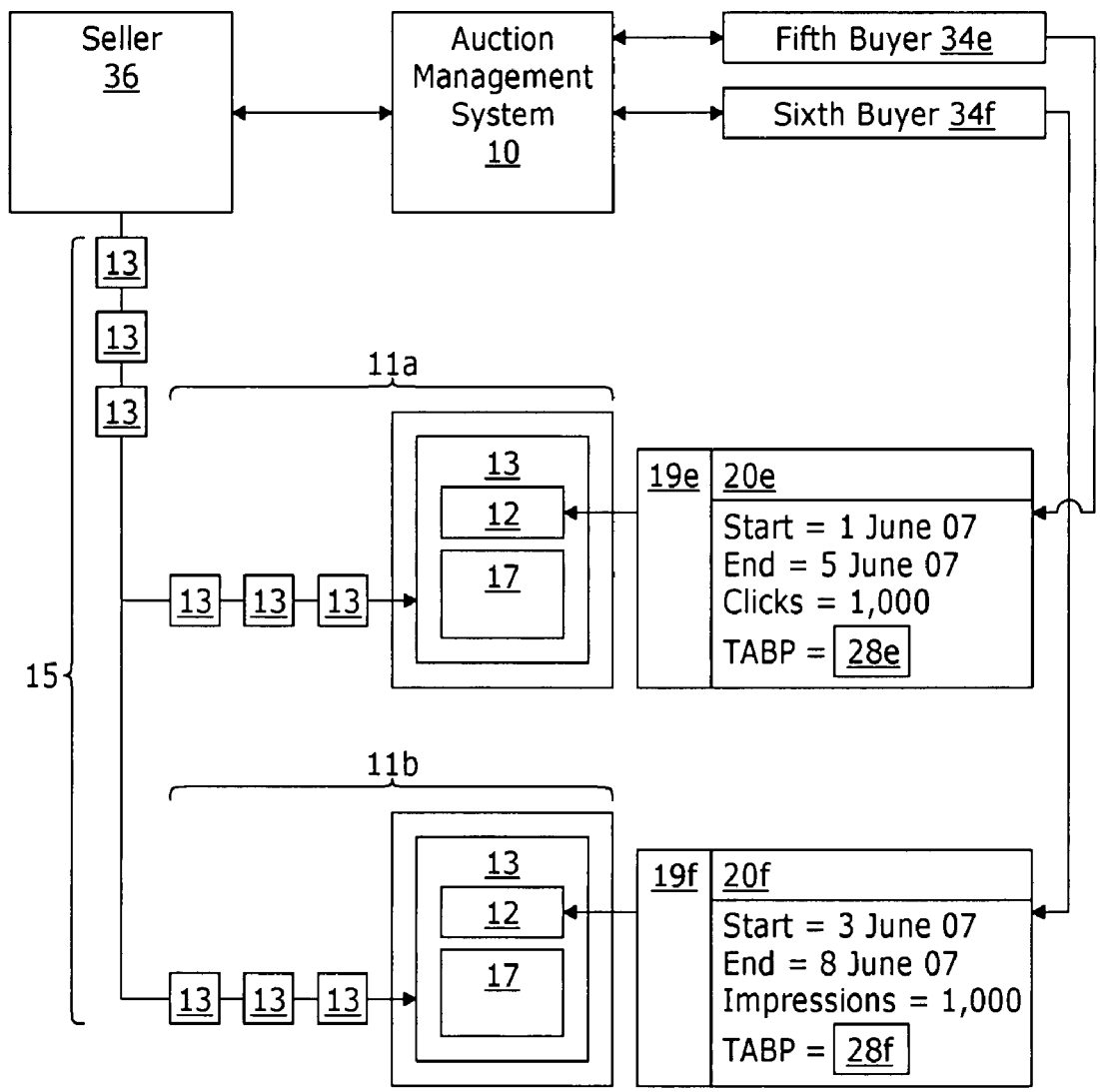
FIG. 2 is a block diagram representing exemplary architecture for implementing a network based auction system and method for brokering the sale of Internet advertisement inventory as discrete traffic blocks of segmented Internet traffic in accordance with an embodiment of the present invention.

Turning to FIG. 2, the Internet traffic 15 may be further segmented into end user segments 11a and 11b (also referred to as attributes segments and traffic segments) based on attributes of the end user to which the web page 13 is to be rendered.

Attribute segments 11a and 11b may be defined based on attribute information that can be determined about the end user prior to rendering of the web page 13 to the end user. Examples include the end user's: i) geographic location, ii) demographic information such as end user's gender, age, and income bracket; and iii) behavioral patterns.

The end user's geographic location which may be determined based on the end user's IP address and/or registration information provided by the end user. Demographic information may be determined by data input by the end user on a registration page. Behavioral information (or other demographic information) may be obtained from information stored on the end user's computer, for example "cookies", which indicates user activity.

In general, if attribute information is available about the end users comprising the seller's Internet traffic 15, it is beneficial to the seller 36 to segment its Internet traffic 15 to allow for the sale of discrete traffic blocks 20 targeting distinct end user attribute segments of the Internet traffic 15.

In more detail, if total web site traffic 15 includes a significantly large quantity of "hits" per day from diverse end users, it is reasonable to expect that certain advertisement content that would appeal to, or be effective with, one segment of those end users (for example male end users) may not be as appealing to, or effective with, another segment of those end users (for example female end users).

Therefore, it is beneficial for the seller to segment the defined traffic block 15 into multiple distinct end user attribute segments 11a and 11b to maximize the aggregate value of the traffic 15. For example, a first end user attribute segment 11a may include end users that are male while a second end user attribute segment 11b may include end users that are female.

Such a segmentation is beneficial to the seller 36 because it can be reasonably expected that aggregate revenue from the sale of discrete traffic blocks to the two segments independently (the male segment being sold to the highest bidder willing to pay for the male segment and the female segment being sold to the highest bidder willing to pay for the female segment) will be greater than revenue from the sale of the entire traffic block 15 as single segment including both male and female end users.

In this example, the fifth buyer 34e may purchase a discrete traffic block 20e for ad placement 12 which comprises rendering of 1,000 clicks within ad placement 12 between 1 Jun. 2007 and 5 Jun. 2007. The discrete traffic block 20e may comprise attribute segment 11a which may be a male attribute segment comprising those end users receiving the web page 13 which are male.

Similarly, the sixth buyer 34f may purchase a discrete traffic block 20f for ad placement 12 which comprises 1,000 clicks between 3 Jun. 2007 and 8 Jun. 2007 (e.g. rendering a sufficient quantity of impressions within the ad placement 12 to generate the purchased quantity of clicks). The discrete traffic block 20f may comprise attribute segment 11b which may be a female attribute segment comprising those end users receiving the web page 13 which are female.

While the example shown in FIG. 2 represents segmentation of traffic 15 into only two traffic segments 11a, and 11b, it should also be appreciated that each traffic block segment may be further segmented based on other attributes determinable about the end user. However, further segmentation is not beneficial when, after segmentation, the quantity of expected impressions within the segment would be too small to be meaningful to an advertiser/buyer. A more detailed discussion of segmentation is included herein.

Figure 3:
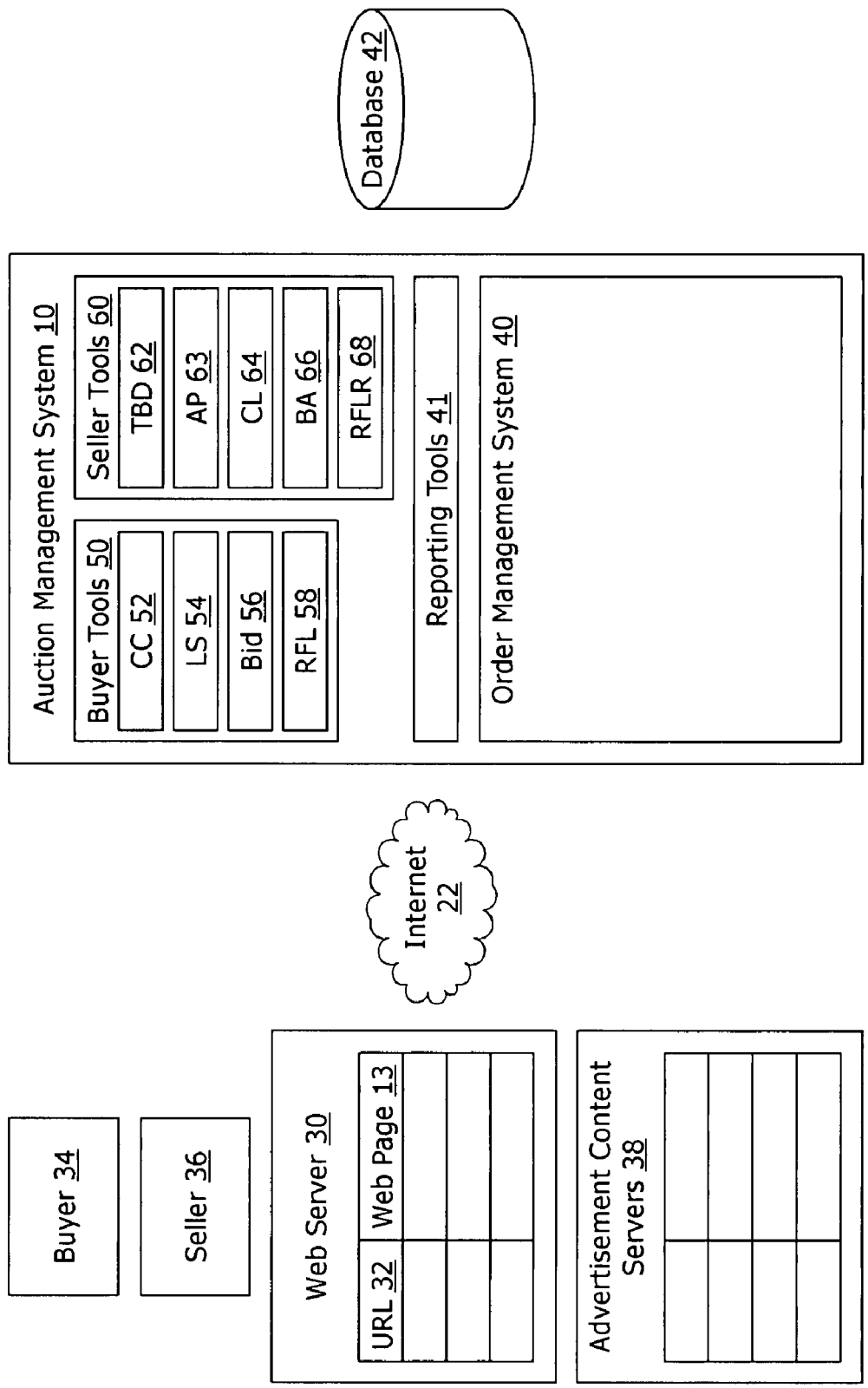
FIG. 3 is a block diagram representing an auction management system in accordance with an exemplary embodiment of the present invention.

Turning to FIG. 3, the auction management system 10 may be coupled to the Internet 22 and operate as a web server for interacting with at least one buyer 34 and at least one seller 36.

For purposes of interacting with the auction management system 10, the buyer 34 may comprise a computer system operating a traditional web browser through which a buyer has accessed the auction management system 10 through a buyer account (e.g. logged on using defined buyer credentials such as a user name and password).

Similarly, the seller 36 may comprise a computer system operating a traditional web browser through which a seller has accessed the auction management system 10 through a seller account (e.g. logged on using defined seller credentials such as a user name and password).

The auction management system 10 may comprise seller tools 60, buyer tools 50, an order management system 40, and reporting tools 41. In general, the seller tools 60 represent work flows for performing various tasks associated with a seller: i) segmenting the seller's website traffic 15 to develop an inventory of ad placements within segmented traffic; and ii) defining and listing such inventory.

Other seller tools 60 represent work flows for performing tasks such as: i) reviewing a buyer's advertisement content for purposes of accepting a purchase of a discrete traffic block; and ii) defining a discrete traffic block in response to a buyer's request for a specified traffic block listing (e.g. an RFL Response, described here).

Yet other seller tools 60 may include workflows for searching and reviewing listings of other sellers for purposes of researching and developing segmentation and pricing strategies.

The buyer tools 50 represent work flows for performing various tasks associated with a buyer defining an advertisement campaign; searching listings of discrete traffic blocks matching campaign criteria, and bidding/purchasing selected discrete traffic blocks. Other buyer tools 50 represents work flows for performing tasks such as defining a request for listing (RFL) to solicit seller proposals/responses that include discrete traffic blocks meeting the defined RFL.

The order management system 40 directs delivery of advertisement impressions in accordance with purchases of traffic blocks made by buyers and the reporting tools 41 generally enable buyers and sellers to access data related to Internet advertising activities.

Seller Tools

A traffic block definition tool 62 provides work flows that enable a seller 36 to segment its Internet traffic 15 associated with a web page 13 and record each segment 11a and 11b (FIG. 2) within a traffic profile associated with the seller 34.

As discussed, segmentation may be based on any combination of attributes related to end users to which advertisement impressions will be delivered including geographical information, demographic information, and behavioral information—all of which may be obtained, at least in part, through IP address, registration information collected by the seller, and/or cookies.

Referring briefly to FIG. 4, an exemplary embodiment of the system 10 may include a global attribute library 70 which includes all attributes that may be used to segment Internet traffic 15 into traffic segments 11a and 11b.

The global attribute library 70 may include several thousand, or more, attribute descriptions 72. Again, examples include: i) geographical attributes such as United States, United Kingdom, regions of the United States such as New England, Mid Atlantic, and South East, and individual states and/or postal codes; ii) demographic attributes may include male/female, age brackets and income brackets; and iii) behavioral attributes (not shown).

In general operation, the traffic block definition tool 62 provides work flows to the seller 36 to enable the seller to define a traffic profile comprising one or more web pages(s) 13 and to create a traffic blue print (using attributes from the global attribute library) for each attribute segment 11a and 11b of the traffic profile.

For example, referring briefly to FIG. 5a, a seller may define a first traffic profile (traffic profile ID 232a) to include a single web page 13 on with ad placements 12, 14, and 16 may be rendered. A second traffic profile (traffic profile 232b)

may include multiple related web pages 13 within the seller's website. The inclusion of multiple web pages within a single traffic profile is useful when the traffic profile of end users that access those pages is consistent across for all of those pages. As an example, it may be useful for a seller operating a web site with news articles to group those multiple pages related to sports news into a single traffic profile and those multiple pages related to finance news into a second traffic profile. Each ad placement 12, 14, and 16 may be rendered in permutations of one or more of the web pages associated with the traffic profile.

Turning to FIG. 5b, a traffic profile (of one or more web pages 13) that does not require user registration for access and receives heavy volume from U.S. end users may be segmented solely based on geography because demographic information about a particular end user may not be known. In the example of FIG. 5b, segmentation to develop a traffic template 76 may be based on an attribute subset 80 of the global attribute library 70. A first traffic segment 11a may include a traffic attribute blue print 28a in which attributes of United States and New England are identified. Similarly segments 11b through 11f, including traffic attribute blue prints 28b through 28f respectively, each identifying other regions of the United States as the applicable attribute. Segment 11g includes a traffic attribute blue print 28g with no specified geography and as such would be a segment that includes all non US end users by virtue of such end user's not being within any of the other segments 11a-11f.

As another example, turning to FIG. 5c, a traffic profile that requires user registration may be segmented based on demographic information. The first segment 11a may include a traffic attribute blue print 28a identifying female end users without further attributes. Segments 11b through 11f may include traffic attribute blue prints 28b through 28f respectively, each identify male end users further segmented by age group. As such, female end users will be within the first segment 11a while male end users will be within the proper segment 11b through 11f.

As will be discussed in more detail herein, when an advertisement request is received by the order management system 40, the request will designate certain end user attributes known about the end user to which the web page 13 will be rendered. The order management system 40 may match the end user attributes to the traffic attribute blue print 28 of each of the traffic segments 11 of the traffic profile template 76 to identify the traffic segment 11 to which the end user best corresponds. The order management system 40 will then serve advertisement content of an active traffic block campaign (e.g. an open order) for such traffic segment 11.

Figure 6:
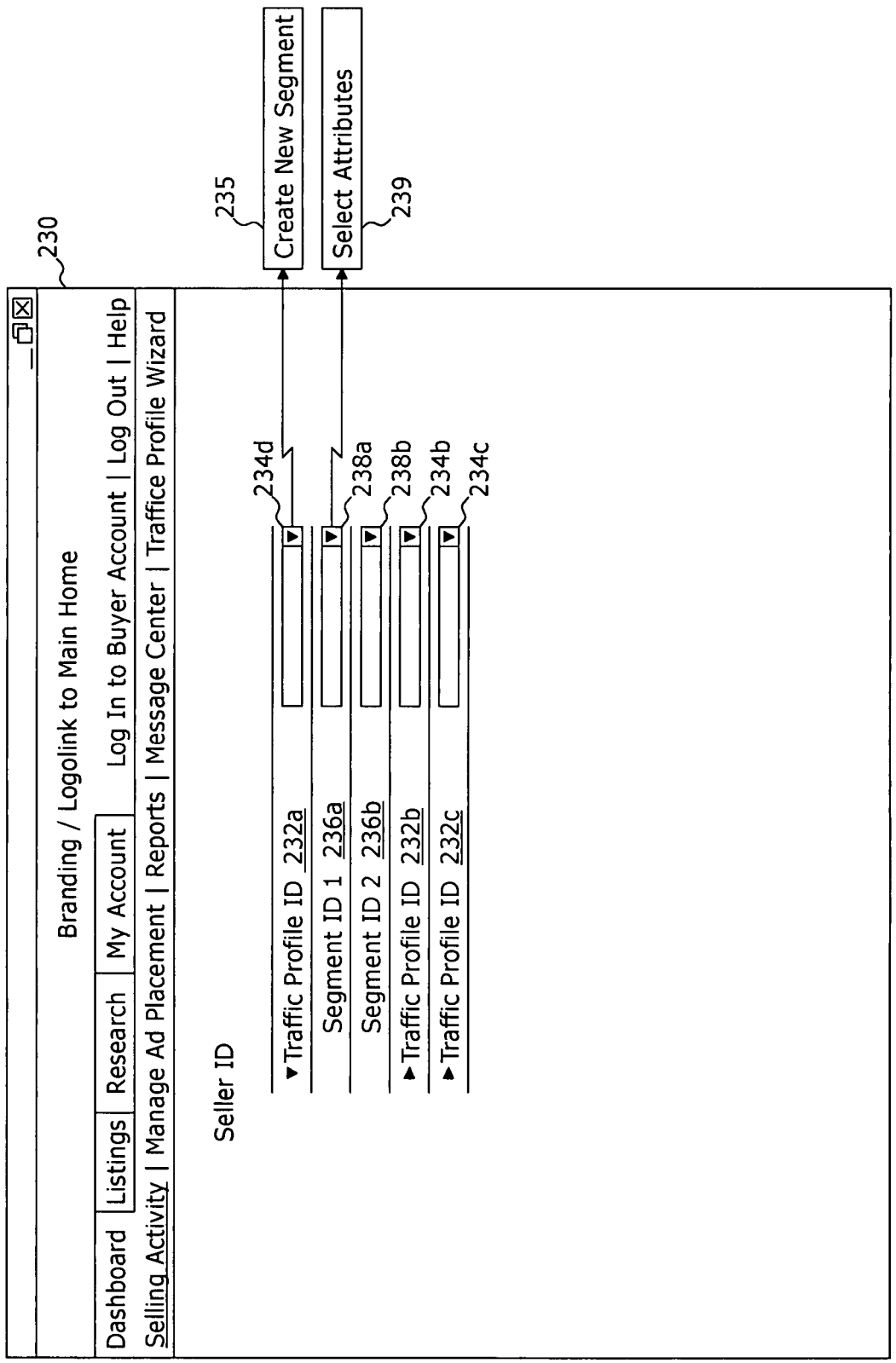
FIG. 6 is a web page diagram representing exemplary work flow for segmenting a seller's Internet traffic in accordance with an exemplary embodiment of the present invention.

FIG. 6a represents an exemplary web page 230 that may be used to implement the work flows associated with defining traffic profiles and segmenting traffic. The web page 230 may list defined traffic profile IDs 232a, 232b, and 232c—each of which represents one or more web page(s) 13 served by the seller's web server and on which the seller is able to render advertisement impressions.

Associated with the traffic profile ID 232a, 232b, and 232c may be a drop down menu control 234a, 234b, and 234c which, as shown for control 234a, includes a selection 235 which enables the seller 36 to create (and name) a new traffic segment 11 for the traffic profile 232.

After the seller 36 has segmented a traffic profile 232, the identification (a segment ID 236a, 236b) may appear as shown below the traffic profile ID 232a. Associated with each segment ID 236a, 236b may be a drop down menu control 238a, 238b which, as shown for control 238a includes a selection 239 which enables the seller 36 to select attributes from the attribute library 70 to associate with the segment.

Figure 7A:
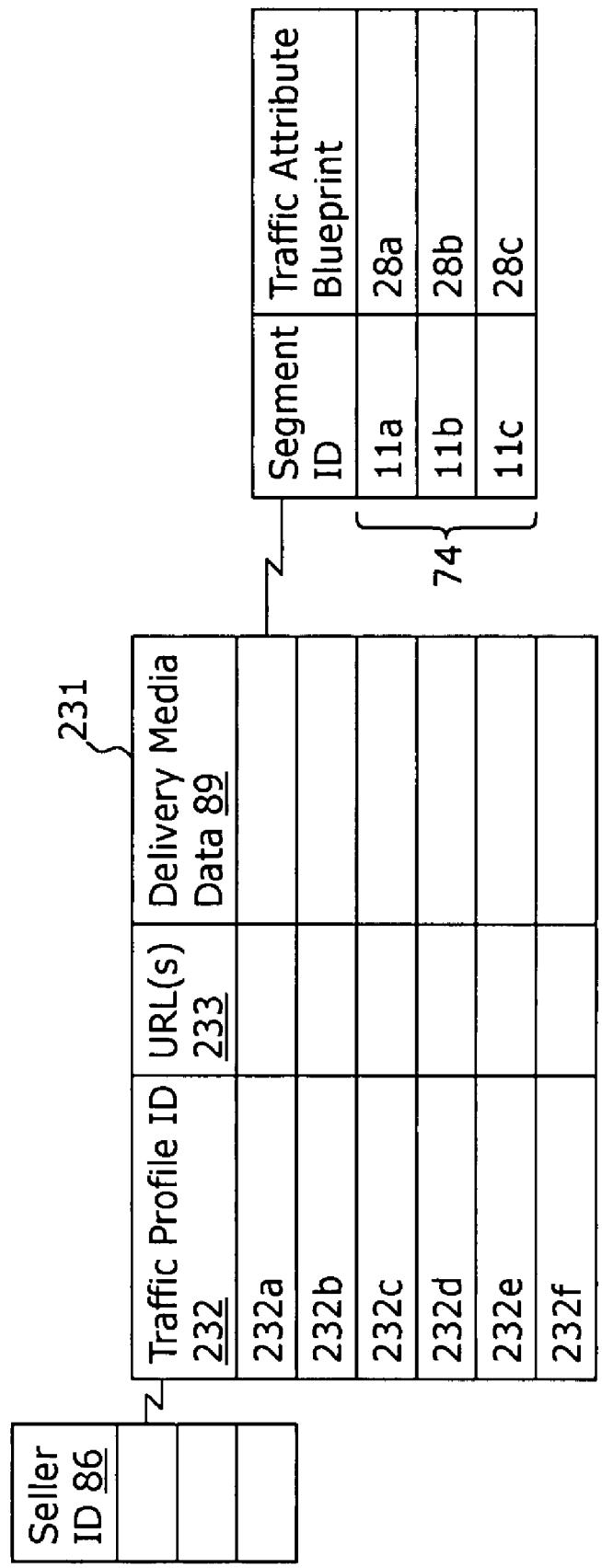
FIG. 7a is a diagram representation relational structures between data associated with segmenting a seller's Internet traffic in accordance with an exemplary embodiment of the present invention.

Turning briefly to FIG. 7a, exemplary data relationships 84 are shown for recording a seller's traffic profiles and segmentation thereof. Associated with a seller ID 86 identifying the seller may be a plurality of traffic profiles, each represented by a traffic profile ID 232a-232f recorded as a record of a traffic profile ID table 231. Each traffic profile ID 232 may be associated with the URL(s) 233 of the web page(s) 13 within the traffic profile and delivery media data 89.

The delivery media data 89 may include information related to attributes of the web page(s) 13, branding associated with the web page(s) 13, and other information related to the content of the web page(s) 13 which is useful to a potential buyer assessing whether the published content is sufficiently related to the buyer's potential advertisement for placement to be beneficial.

Also associated with the traffic profile identifier 232 are a plurality of records 74, each of which represents one of the segments 11a-11c into which the Internet traffic 15 of the traffic profile has been segmented. Each record 74 associates the segment 11a-11c with its traffic attribute blue print 28a-28c (developed as discussed with reference to FIGS. 4, 5b, 5c, and 6).

An advertisement placement tool 63 also comprises work flows for defining ad placements 12, 14, and 16 within the web page(s) 13 of each traffic profile. In more detail, with reference to the data relationships 84 of FIG. 7b, associated with each seller (represented by a seller ID 86) may be a plurality of records 75, each of which represents a one of the ad placements 12, 14, and 16 within the seller's web page(s) 13. Each record 75 associates the ad placement 12, 14, and 16 with: i) its size designator 88 (which may be determined utilizing Interactive Advertising Bureau standard sizes); ii) its position designator 90 defining its position within (or related to) the web page content 13; and iii) the traffic profile ID 232 associated with the web pages 13 on which the ad placement is rendered.

The advertisement placement tool 63 further comprises work flows which enable a seller 36 to segment each ad placement 12, 14, and 16 in accordance with the segments 11a-11c of the traffic profile ID 232 to develop an inventory of segmented ad placements 93a-93e. For example, an inventory table 92 may comprise a plurality of segmented ad placements 93a-93e, each of which is represented by an association between an ad placement 12, 14, or 16 with one or more traffic segments 11a, 11b, 11c of the traffic profile 232 associated with the ad placement.

It should be appreciated that each ad placement 12, 14, and 16 on a web page 13 may be associated with the same traffic profile 232, but may be independently associated with the traffic segments of the traffic profile. For example, region 12 (the banner advertisement on the web page 13) because of it value may be inventoried (and sold) separately for each traffic segment. The other regions, for example region 16 below the fold line 18 being of lower value, typically generating fewer clicks due to its location, may be inventoried (and sold) collectively with all traffic segments. A segmented ad placement 93 may also be referred to as advertisement placement inventory.

The inventory table 92 may also be used to associate inventory statistics with each segmented ad placement 93. The inventory statistics 94 may include values such as: i) expected quantity of impressions per period of time (e.g. expected impressions per day); ii) historical quantity of impressions per period of time (e.g. historical impressions per day); iii) estimated yield factor (e.g. an estimated ratio of quantity of clicks per 1000 impressions); and iv) historical yield factor (e.g. a ratio of historical quantity of clicks per 1000 impressions). The historical data may be tracked and accumulated by the order management system 40 (FIG. 4) between when the segmented ad placement is first defined. Further, when a segmented ad placement is first defined, initial historical data may be determined: i) based on historical data from similar web pages/segmented ad placements of the seller; and/or ii) the web pages/segmented ad placements of the seller which are replaced by the newly defined segmented ad placement.

Figure 8:
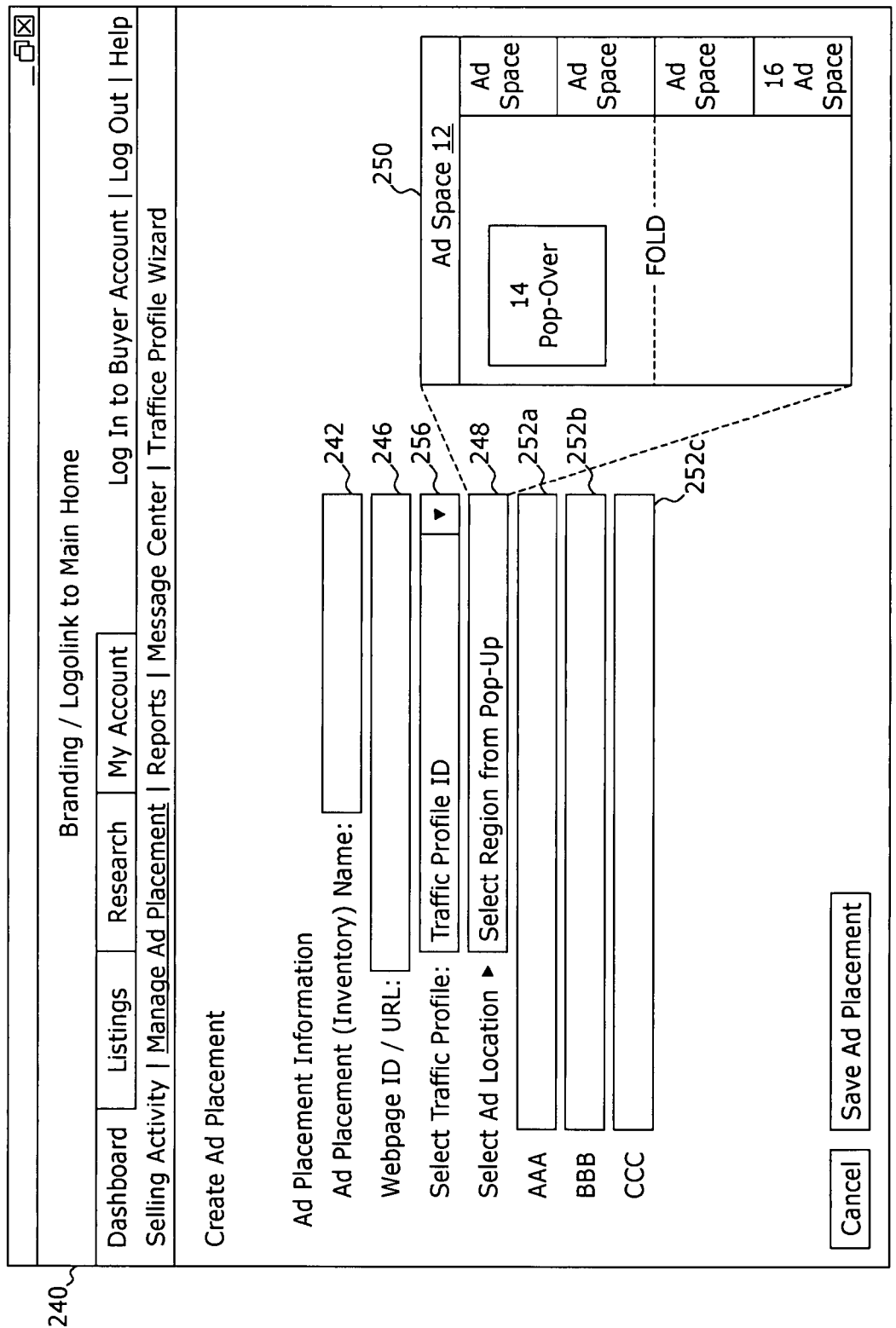
FIG. 8 is a web page diagram representing exemplary work flow for defining an advertisement placement in accordance with an exemplary embodiment of the present invention.

FIG. 8 represents an exemplary web page 240 that may be used to implement the work flows associated with defining an ad placement 12, 16, 16 and associating the ad placement with a traffic profile ID. Referring to FIG. 8 in conjunction with FIG. 7b, the web page 240 may comprise an Ad Placement (inventory) control 242, which may be a text box, for obtaining input of name or other identification of an ad placement 12, 14, 16 within a web page 13.

A web page ID control 246, which also may comprise a text box, obtains user identification of the web page 13 in which the ad placement 12, 14, 16 will exist. Such selection may be by way of identifying the URL of the web page or other identification of the seller's traffic 15.

A control 256, which may be a drop down menu listing traffic profiles 232a-232f associated with the seller (FIG. 7a), obtains user input or election of a traffic profile 232 to be associated with the ad placement.

A region control 248, which may provide a pop up map 250 of the web page content, obtains user input or election of the specific location of the ad placement 12, 14 or 16 within the web page 13.

Various controls 252a-252c obtain user input or election of various inventory statistics 94 for the advertisement placement 93. As discussed, the inventory statistics 94 may include may include values such as: i) expected quantity of impressions per period of time (e.g. expected impressions per day); ii) historical quantity of impressions per period of time (e.g. historical impressions per day); iii) estimated yield factor (e.g. an estimated ration of quantity of clicks per 1000 impressions); and iv) historical yield factor (e.g. historical ratio of quantity of clicks per 1000 impressions).

Returning briefly to FIG. 3 in conjunction with FIG. 7b, the create listing tool 64 provides work flows that enable a seller to define discrete traffic blocks 20 for its advertisement inventory (e.g. for each segmented ad placement 93) and make such discrete traffic blocks 20 available for buyers to purchase.

In the data relationships 84 of FIG. 7b, each discrete traffic block 20 is represented by a record in a discrete traffic block table 98 which associates with the particular segmented ad placement 93.

Each discrete traffic block 20 may be defined in terms of its duration 96 (e.g. a start time 96a and an end time 96b defining the time period during which the advertisement volume will be delivered) and its volume 98 (quantity of clicks 98a or quantity of impressions 98b). The discrete traffic block 20 may further include an auction start time 103a and an auction end time 103b defining the end time of an auction for purchase of the discrete traffic block 20. A status identifier 102 may indicate whether: i) the auction is active; ii) the auction is ended unsold; iii) the discrete traffic block 20 is sold—but that the start time 96a of the duration has not yet occurred (e.g. the discrete traffic block 20 is not yet an open order); iv) the discrete traffic block is sold 20 and is an active traffic block being fulfilled by the order management system 40 (e.g. the discrete traffic block 20 is an open order); v) the order has been fulfilled; and vi) other status such as order ended short or order canceled.

Those skilled in the art will appreciate that the distinction between the statuses of sold but not open, sold and open order, and fulfilled order may be calculated from other data within the discrete traffic block table 98 and need not be represented within a status field. However, such statuses are represented in the status field for purposes of convenient illustration.

Further associated with the discrete traffic block may be fulfillment fields 104 for tracking order fulfillment. The fulfillment fields 104 may include identification of the actual quantity of clicks 104a and the actual quantity of impressions 104b delivered. Such information will be updated by the order management system 40 (FIG. 3) each time an impression is delivered and/or a click-through achieved, against an open order for the discrete traffic block 20.

As is noted in the discrete traffic block table 98, multiple discrete traffic blocks 20 may be sold for a segmented ad placement 93—with concurrent (e.g. at least partially overlapping) time periods for fulfillment. It is preferable that the multiple discrete traffic blocks 20 sold for any segmented ad placement include volumes such that impressions and/or clicks required for fulfillment of all discrete traffic blocks for any particular time period does not exceed the inventory available during that duration of time. For example, it would be inappropriate to define multiple discrete traffic blocks 20 that, in the aggregate require an inventory of 20,000 impressions on a certain day when the expected quantity of impressions on such certain day is only 15,000.

Other exemplary data which may be associated with any discrete traffic block 20 include: i) minimum bid/start bid price or reserve price, ii) an immediate purchase price (e.g. buy-it-now, or One CLIQ Buy Price); and iii) seller specified advertisement content (e.g. fail over content) for placement within the ad placement in the event that there are no open orders, or other revenue generating advertisement content available at the time an impression is required for delivery to an end user.

In another aspect, it is envisioned that an invitation only auction may serve to create or enhance the perception of such seller's traffic as being premium inventory, and may, at the option of the seller, eliminate the need to review creative ad units of the invited buyer with a winning bid.

As such, in an embodiment of the present invention, a discrete traffic block 20 may be associated with a buyer group parameter or group identifier 106. The group identifier 106 may define a plurality of private buyers that may participate in the bidding on a listing (an invitation only auction). The private buyers are selected by the seller. However, the auction management system 10 may suggest inclusion of additional buyers based on historical advertising activity or other factors.

Figure 9:
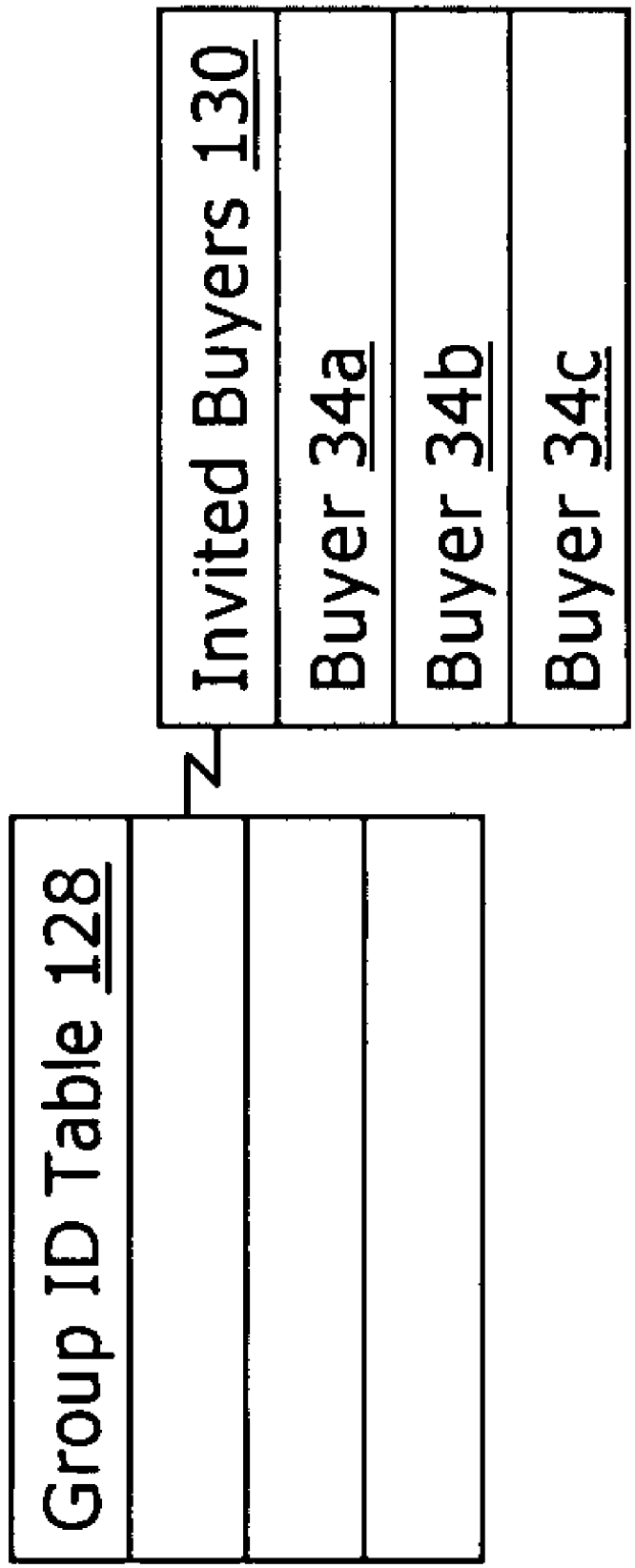
FIG. 9 is a diagram representing relations structures between data associated with the hosting of private auctions in accordance with an embodiment of the present invention.

Referring briefly to FIG. 9, each group identifier 106a, 106b, and 106c, represented by a record in a group identifier table 128, may be associated with an invited buyers table 130, each record of which identifies a one of a plurality of private buyers within the group.

Figure 10A:
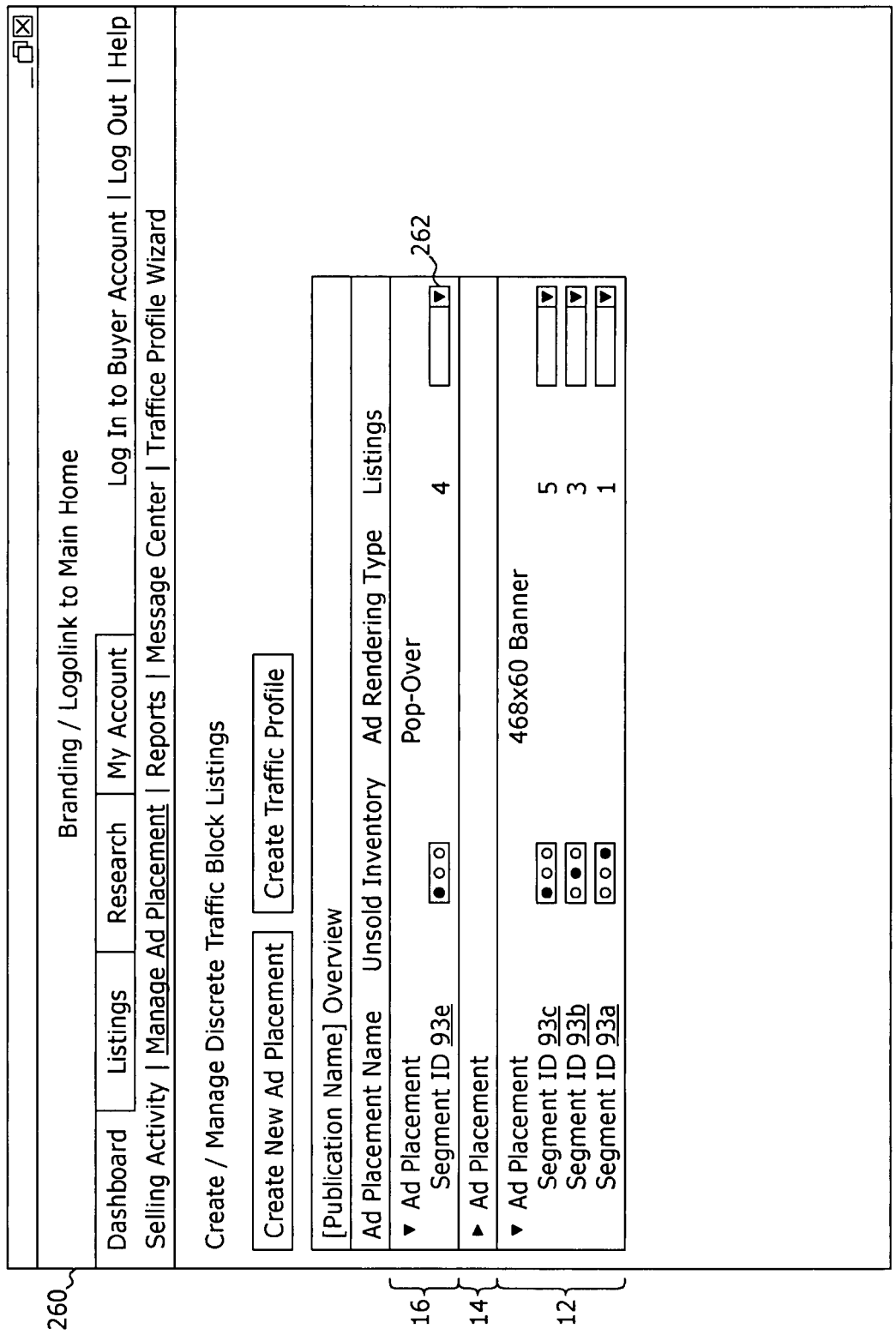
FIG. 10a is a web page diagram representing exemplary work flow for managing segmented advertisement placement inventory in accordance with an exemplary embodiment of the present invention.

Referring to FIG. 10a in conjunction with FIG. 7b, a first exemplary web page 260 that may implement the work flows for defining and listing discrete traffic blocks 20 is shown. The exemplary web page 260 may display each ad placement 12, 14, 16 of the seller. Associated with each ad placement 12, 14, 16 may be its segmented ad placements. For example, segmented ad placements 93a, 93b, and 93c may be associated with ad placement 12. Segmented ad placement 93e may be associated with ad placement 16.

An unsold inventory alert icon 264, which may appear as a traffic light of a red, yellow, or green color, may alert the user to whether unlisted inventory exists for the ad placement 12, 14, 16 or the segmented ad placement 93. In more detail, if discrete traffic blocks which have been listed include volumes which, in the aggregate, are above a predetermined threshold of the expected volume for the segment, the icon 264 may appear "green light" indicating that inventory is listed for sale and/or sold. Similarly, if excess expected volume has not been defined and listed in discrete traffic blocks, the icon 246 may appear "red light" indicating that unlisted and/or unsold inventory exists.

A drop down menu control 262 may link to separate web pages useful for managing existing discrete traffic blocks 20 for the segmented ad placement 93 and/or defining and listing new discrete traffic blocks 20.

FIG. 10b represents an inventory report 376 web page for displaying inventory associated with a segmented ad placement 93. In an exemplary embodiment, the inventory report 376 may, for each of a plurality of days 378, associate, for the segmented add placement, data related to delivery of volume against orders 380, data related to volume ordered but not yet delivered 382, total committed inventory 384, listed inventory 386, and the total portion of projected inventory that is not yet sold 388. Such an inventory report 376 may be useful in assisting a seller in determining to list additional inventory as well as monitor progress of delivery of volume against orders.

Figure 10C:
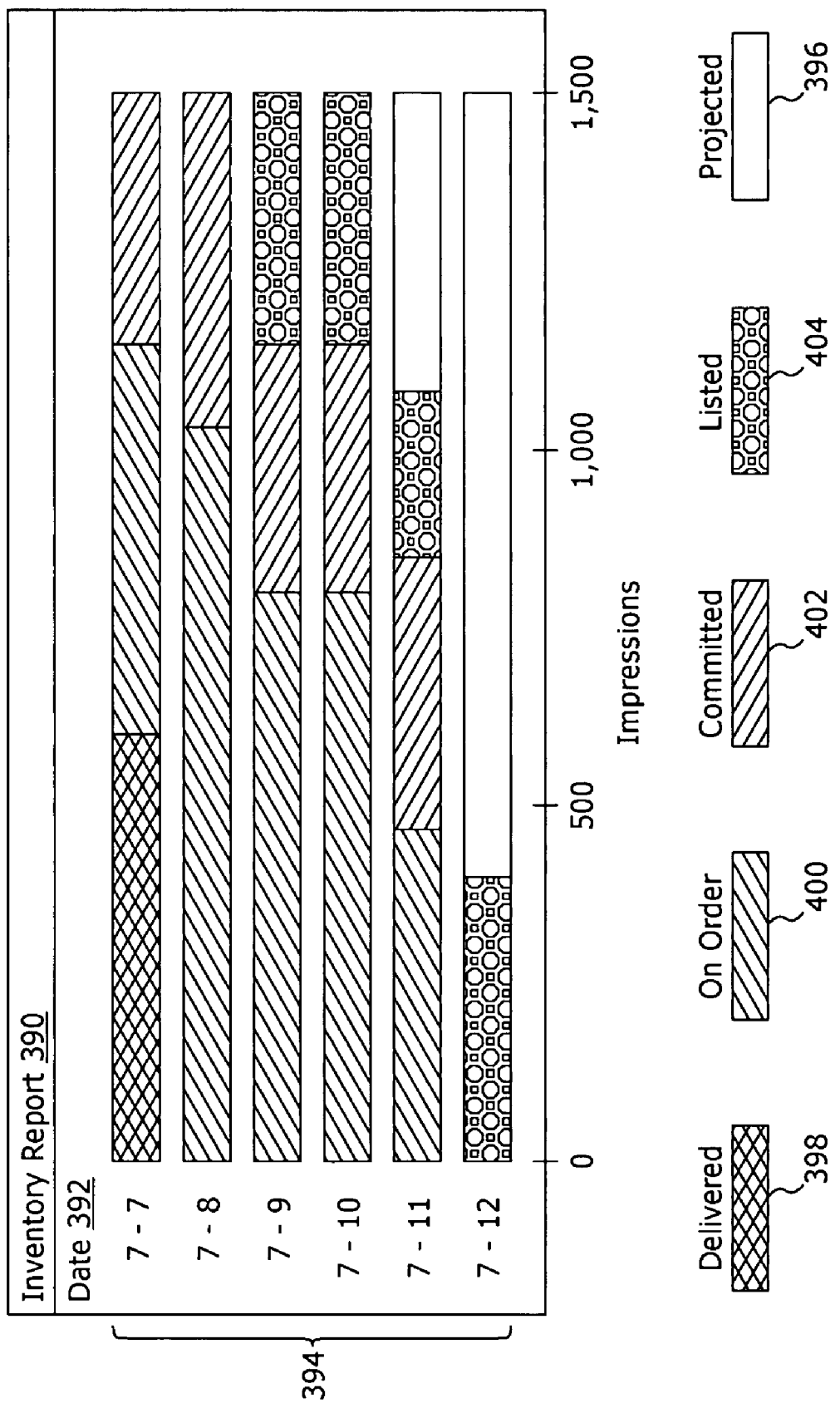
FIG. 10c is a web page diagram representing a second embodiment of an inventory report in accordance with an exemplary embodiment of the present invention.

FIG. 10c represents an alternative inventory report 390 web page for displaying inventory associated with a segmented and placement 93. This alternative inventory report 390 is in the form of a bar chart. For each day 392, a single bar 394 graphically depicts total projected inventory 396, volume delivered against orders 398, volume ordered, but not delivered 400, additional committed volume 402, and listed volume 404.

Although both of the inventory report of FIG. 10b and the alternative inventory report of FIG. 10c represent reporting of inventory on the basis of days, comparable embodiments may include similar reports wherein the data is reported on the bases of weeks, months, or other useful time periods.

FIG. 10d represents a web page that may implement the work flows for defining and listing discrete traffic blocks 20. Turning to FIG. 10d in conjunction with FIG. 7b, the exemplary web page 280 may display detailed information about the discrete traffic block 20 defined for the ad placement 93 (FIG. 10a). The web page 280 further comprises a Create New Listing control 282 which may provide work flows (e.g. a wizard) for obtaining such information for new discrete traffic blocks to list for sale.

The seller may select a control from FIG. 10a to link to the exemplary web pages of FIGS. 10b, 10c and 10d.

Returning again to FIG. 3 in conjunction with FIG. 1, the bid acceptance tool 66 provides work flows that enable a seller 34 to accept or reject a bid for a discrete traffic block 20. It is envisioned that a seller 34 may object to placement of certain buyer defined advertisement content 19 within its web page 13. As such, the work flows, within a predetermined time period (e.g. for example, a time period following the auction end time 103b of FIG. 7b), make the buyer defined advertisement content 19 available to the seller 34 to enter an approval or an objection.

Referring again to FIG. 3, to facilitate a buyer purchasing a discrete traffic block, buyer tools 50, inclusive of the configure campaign tool 52, listing search tool 54, and bid tool 56, enable a buyer to configure elements of an advertising campaign, search for listings of discrete traffic blocks 20 (FIG. 7b), and purchase of such discrete traffic blocks 20—by bid, by an immediate purchase (e.g. buy-it-now or One CLIQ Buy), or other means.

Figure 11:
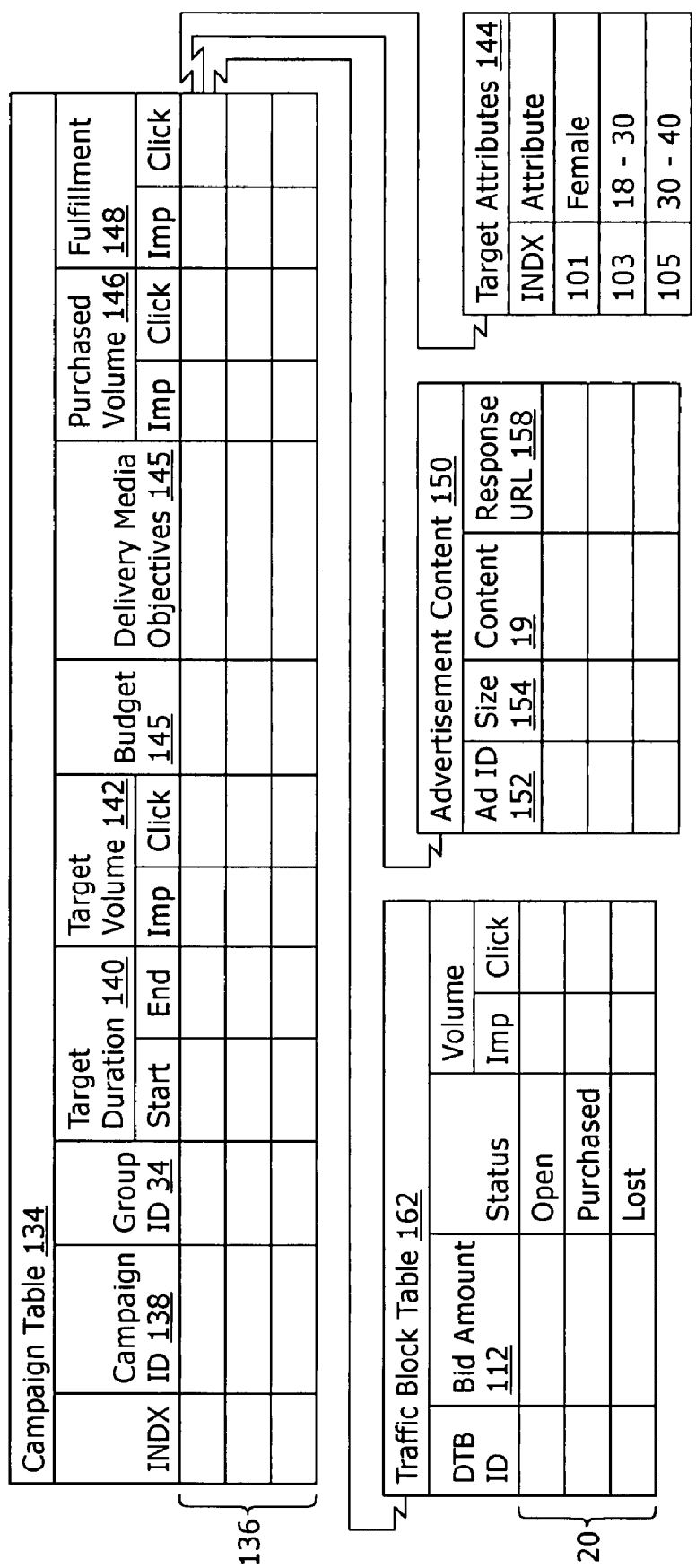
FIG. 11 is a diagram representing relational structures between data associated with a buyer's advertising campaign in accordance with an embodiment of the present invention.

Turning to FIG. 11, exemplary data relationships of a buyer's advertising campaign are shown. Each record 136 of a campaign table 134 may represent an advertising campaign identified by a campaign ID number 138.

Associated with the campaign are identification of the buyer 34, its buyer defined target duration 140 (including a target start date and a target end date), its target volume 142 (which may be a target volume of impressions, a target volume to clicks, or a target volume of other user action, for example user completion of a lead generation forms), and its target advertising budget 145.

Throughout the campaign, additional data associated with the campaign may include: i) purchased volume data 146—for example data representing the quantity of impressions or clicks purchased as discrete traffic blocks; and ii) fulfillment data 148 representing the actual volume—for example quantity of clicks or impressions delivered through the discrete traffic blocks (or as filler advertisements). These values may be updated by the order management system 40 (FIG. 3) when the buyer purchases a discrete traffic block and updated as volume is delivered—for example by advertisement content being placed as an impression and/or "clicks" are recorded.

Also associated with the campaign are its target end user attributes 144. Turning briefly to FIG. 4 in conjunction with FIG. 11, the target end user attributes 144 comprises identification of a subset of attributes, from the attribute library 70, which the buyer desires to utilize for searching and/or matching of discrete traffic blocks to the advertisement campaign for purposes of assuring that any purchased discrete traffic block includes segmented inventory which corresponds to the target end user attributes 144.

Also associated with the campaign are the buyer's defined creative advertisement content in one or more rendering formats. The exemplary ad content table 150 includes records for one or more instances of buyer's creative advertisement content that the buyer may define, create, upload, or otherwise associate with an advertisement campaign. Each record associates ad identification 152 with identification of its size 154 (again, for example, utilizing an Interactive Advertisement Bureau standard size), the creative content 19 (e.g. the image, video, or other creative rendering content that will be rendered with the web page content 13), and a response URL 158 which identifies the URL of the advertiser's web page to which the advertiser desires a user to be directed upon clicking the advertisement impression.

Returning to FIG. 3, in general, the listing search tool 54 provides for matching of buyer needs as set forth in the goals of a campaign against available seller listings, with relevance based on attributes, price, run time, transactional units, and other relevant factors.

In more detail, referring to FIG. 3 in conjunction with FIGS. 7 and 11, the listing search tool 54 provides work flows for: i) matching discrete traffic blocks 20 with the objectives of an advertisement campaign 136; and ii) displaying such discrete traffic blocks.

Figure 12:
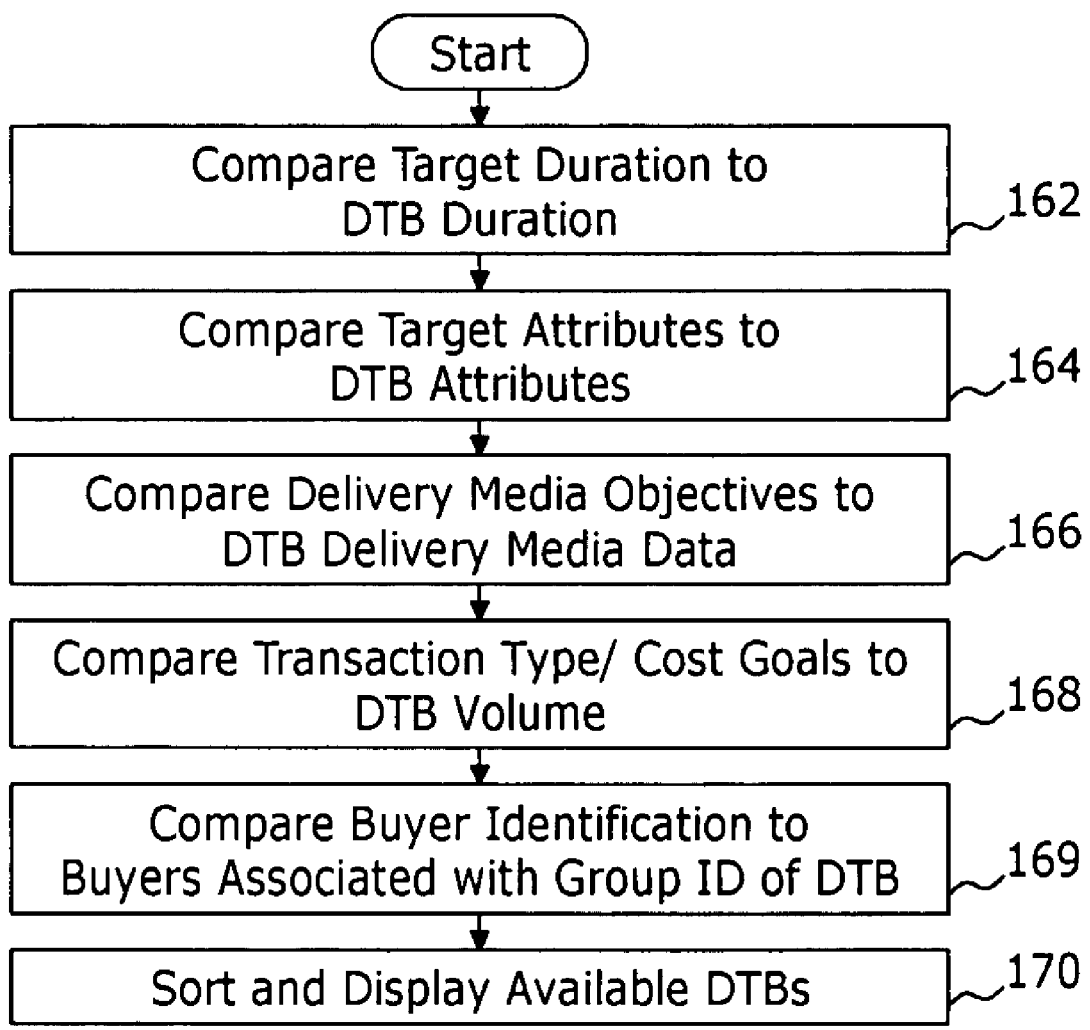
FIG. 12 is a flow chart representing exemplary steps for associating discrete traffic blocks with objectives of a buyer's campaign with in accordance with an embodiment of the present invention.

Turning briefly to FIG. 12 in conjunction with FIG. 7b and FIG. 11, matching discrete traffic blocks 20 with the objectives of an advertisement campaign 136 may comprise steps of: i) comparing the target duration of the advertisement campaign 136 with the duration 96 (or at least the start date 96a) of the discrete traffic block 20 as represented by step 162; ii) comparing the target attributes of the advertisement campaign 136 with the segment blue print 86 of the discrete traffic block 20 as represented by step 164; iii) comparing the delivery media objects of the advertisement campaign 136 with the delivery media data 89 of the web page of the discrete traffic block 20; iv) comparing the transactional unit type and cost goals of the campaign with the volume and costing statistics of the discrete traffic block 20 as represented by step 168; and comparing identification of the buyer with buyers associated with a group ID of the discrete traffic block (if a private auction) as represented by step 169.

After making such comparisons, the discrete traffic blocks with a status 102 of unsold and for which the auction has not yet expired (e.g. end time 103 has not yet occurred) are sorted and displayed at step 170.

Figure 13:
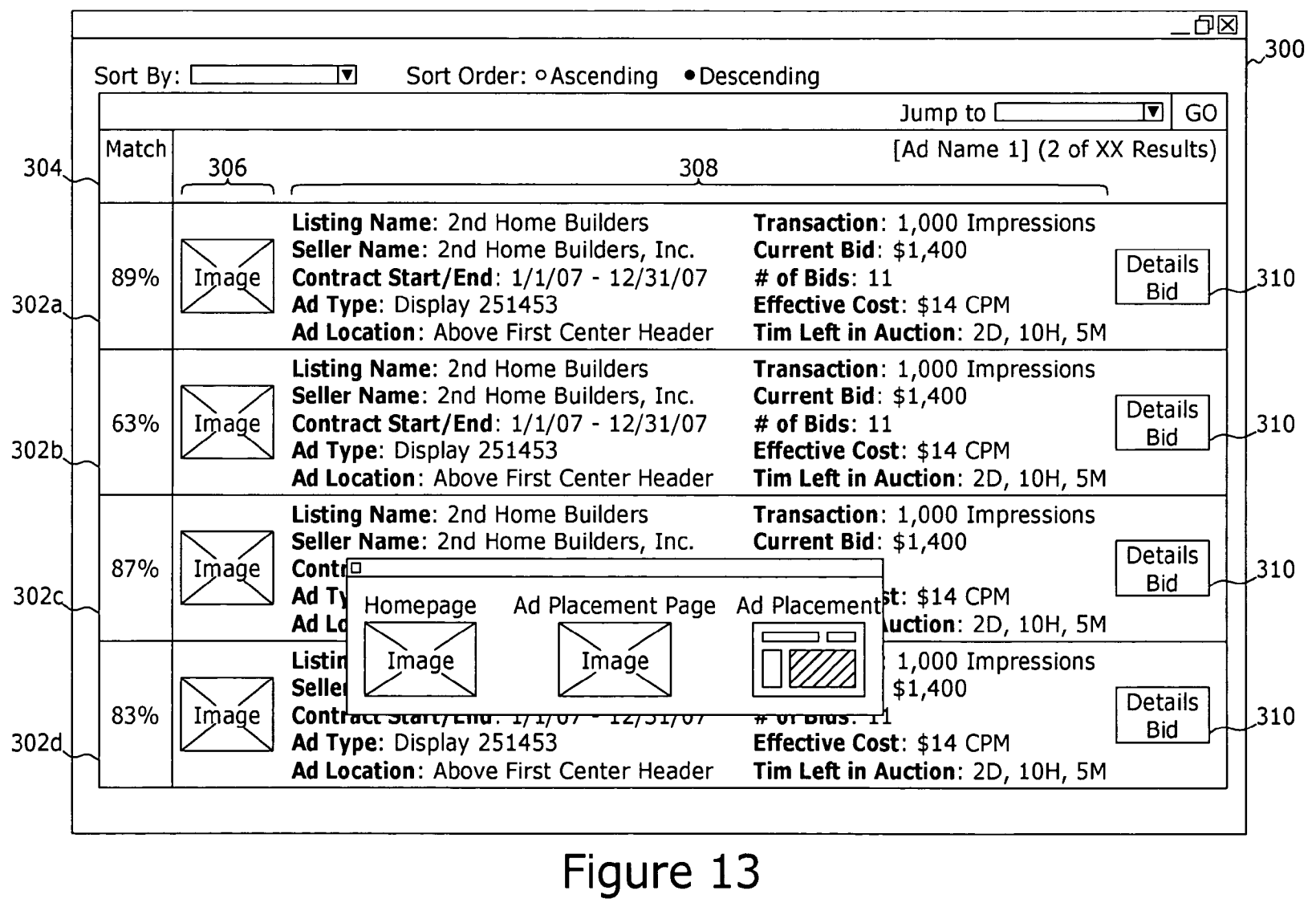

Turning briefly to FIG. 13, the display may comprises a listing display web page 300 which includes a listing 302a-302d for each of a plurality of discrete traffic blocks matching the search criteria. The web page 300 further comprises various controls for enabling further sorting and searching of listings by the buyer.

Each listing display 302 includes: i) an indicator 304 identifying how closely the discrete traffic block matches the buyer's advertisement campaign; ii) a thumb nail image 306 of the sellers website content 13 inclusive of identification of the ad placement therein; and iii) various other information about the discrete traffic block.

Each listing display 302 further includes a bid control 310 which, if selected by the buyer, initiates operation of a bid tool to enable the buyer to bid to purchase the discrete traffic block 20 represented by the listing display 302.

Returning to FIG. 3, in general the bid tool 56 provides for recording a buyer's bid for a discrete traffic block, recording a buyer's bid for placement of filler advertisement content (e.g. continuous auction), and providing expected cost/price economic statistics based on expected results the advertisement content and/or the expected results provided by the seller's web page.

Referring to FIG. 14, in conjunction with FIG. 3, exemplary data relationships 180 established by, and managed by, the bid tool 56 may include representing each bid for a discrete traffic block 20 as a bid record 182 in a bid table 110.

The bid record 182 may include an identification of the buyer 34, identification of the buyer's advertisement content 19, and a raw bid 112 entered by the buyer. In one aspect, the raw bid may be the buyer compensation parameter and the selection parameter for determining the winning bidder may be the highest raw bid entered.

In another aspect, wherein the discrete traffic block 20 is based on a transactional unit such as the user clicking through to the buyer's web site (e.g. a click), an effective value for each bid 122, for example an effective cost-per-thousand impressions (eCPM), may be calculated and recorded as the buyer compensation parameter and the selection parameter for determining the winning bidder may be the highest eCPM of the entered bids.

It should be appreciated that when volume is based on a transactional unit other than impressions (e.g. based on clicks) the quantity of impressions that will be needed to generate the defined volume of clicks is dependent, at least in part upon the ability of the buyer's advertisement content to entice an end user to click through to the advertiser's web site.

The eCPM calculation is based on yield factor (e.g. conversion rate) of the buyer's advertisement content and/or advertisement campaign as may be tracked by the order management system 40.

As a very basic example, a first buyer may have advertisement content with a conversion ratio such as 1 click per 1,000 impressions while a second buyer may have advertisement content with a conversion ratio of 1 click per 2,000 impressions—a conversion factor that is only half that of the first buyer.

If a discrete traffic block comprises a volume of ten click-throughs, it can be expected that 10,000 impressions will be required to deliver the volume if the discrete traffic block is purchases by the first buyer while 20,000 impressions would be required to deliver the volume if the discrete traffic block is purchased by the second buyer.

The seller of the discrete traffic block would rather accept a bid from the first buyer if the second buyer's bid is anything less than double the bid of the first buyer. For example, if the first buyer bids $10.00, the seller would rather accept such bid even if the second buyer bids more than $10.00 but anything less than $20.00.

To facilitate such, the auction may be based on selecting the bid with the highest eCPM wherein the first buyers bid of $10.00 on an eCPM (e.g. effective cost per 1,000 impressions) basis is $1.00 because 10,000 impressions are expected to be required to deliver the 10 clicks. Assuming the second buyer bids $15.00, on an eCPM basis, the second buyers bid is only $0.75.

It should be appreciated that without use of eCPM for the basis of the auction, the second buyer would win the auction with a raw bid of $15.00. However, if the auction is based on eCPM, the first buyer's bid of $10.00 would win the auction. The benefit of the calculating eCPM is that it enables a seller to determine the value of its inventory on a per-impression basis and compare all bids on a per-impression basis.

The eCPM value 122 may be calculated using various yield factors (e.g. conversion rates) including, but not limited to:

First, a yield factor of the advertisement content within a specific advertisement placement (e.g. traffic segment 93) which may be referred to as Yfao and calculated in accordance with the formula of FIG. 22a. In the event that Yfao is known for a particular bid on a particular discrete traffic block, it may provide the most accurate calculation of eCPM.

Second, a yield factor for the advertisement content (across all advertisements placements (e.g. all traffic segments 93) within which the advertisement content has been placed) which may be referred to as Yfa and calculated in accordance with the formula of FIG. 22b. In the event that Yfao is unknown, Yfa may provide a fairly accurate estimate eCPM assuming that the advertisement content performs equally well in various traffic segments.

Third, a yield factor based on all advertisement content within a buyer's advertisement campaign (within a specific advertisement placement (e.g. traffic segment 93) which may be referred to as Yfco and calculated in accordance with the formula of FIG. 22c. In the event that Yfao is unknown and/or the advertisement content is too new to calculate Yfa, Yfca may provide an estimate of eCPM based on past performance of other advertisement content within the buyer's campaign.

Fourth, a yield factor based on all advertisement content within a buyer's advertisement campaign (across all advertisements placements (e.g. all traffic segments 93) within which the advertisements content has been placed) which may be referred to as Yfco and calculated in accordance with the formula of FIG. 22d. In the event that Yfao, Yfa, and Yfca are unknown, Yfco may provide an estimate of eCPM based on past performance of other advertisement content in other traffic segments.

It should be appreciated that values needed for calculating the various yield factors may include the inventory statistics 94 as discussed with respect to FIG. 7b and statistics traced by the order management system 40.

Returning briefly to FIG. 11, the bid tool 56 may further associate (as represented by traffic block table 162) each campaign 136 with those discrete traffic blocks 20 purchased for the campaign to facilitate tracking and reporting on the campaign's performance and fulfillment against its target volumes and budget.

For example, the traffic block table 162 includes a plurality of records, each of which identifies a discrete traffic block 20 for which the buyer has bid for fulfillment of the campaign. The record may further include the buyer's raw bid amount, the status (such as auction still open, purchased, lost) and the volume.

Returning again to FIG. 14, the exemplary data relationships 180 established by, and managed by, the bid tool 56 may further include representation of each bid for placement of filler advertisement content 26 as a filler bid record 184 in a filler bid table 116.

The filler bid record 184 may include an identification of the buyer 34, identification of the buyer's advertisement content 19, a bid 118 entered by the buyer either on a per impression basis, and an expiration time 120 entered by the query.

As discussed, this enables the order management system 40 (FIG. 3) to place the buyer's advertisement content, as filler advertisement content 26 (FIG. 1) in the event that excess volume exists. In one aspect, only buyers who bid for a discrete traffic block within an advertisement placement 93 (FIG. 7*b*) are permitted to bid for placement as filler advertisement content 26.

In other aspects, the bid tool 56 provides typical auction controls which create limitations on a buyer's ability to bid on a discrete traffic block listing and a seller's ability to cancel a discrete traffic block listing based on submitted bids, including (i) by not allowing bids less than a minimum bid, if any, set by the seller during the traffic listing creation process; (ii) by not allowing bids less than a minimum incremental bid, if any, set by the seller during the traffic listing creation process; (iii) by halting further bidding and deeming a bid to be a winning bid if an immediate purchase price (e.g. buy it now or One CLIQ Buy price) is bid by a buyer; (iv) by preventing a seller from terminating a listing for a discrete traffic block if at least one bid has been placed by a buyer, provided such bid meets the minimum bid requirement, if any, (v) by preventing a bid from a buyer when the buyer does not have a sufficient account balance to be reserved for such bid in the event such bid becomes the winning bid, (vi) by allowing a seller to set the time and date an auction for a listing for a discrete traffic block will begin and end, during the listing creation process, thereby limiting the time during which a buyer may submit a bid for such discrete traffic block; (vii) by preventing a buyer from submitting a bid less than a winning bid, and (viii) by preventing a buyer from withdrawing a winning bid.

Additional embodiments of the bid tool 56 may include work flows that enable a buyer to set up parameters for automatically locating and bidding on listings. In more detail, a buyer may create high level metrics for certain associations between a prospective discrete traffic block and the campaign objectives. When the bid tool 56 recognizes that a discrete traffic block matches the high level metrics, a bid may be automatically entered by writing of a bid record 182 to the bid table 110.

Request for Listing/Response to Listing

Returning to FIG. 3, the request for listing tool 58 and the request for listing response tool 68 (also referred to as the response tool 68) provide an alternative system and method for brokering the sale of an advertising region within a discrete traffic block between a seller and a buyer.

In a first aspect, the request for listing tool 68 may operate in a similar manner to the create campaign tool 52, or invoke operation of the create campaign tool, to provide for development of the data relationships related to the buyer's campaign as previously discussed with respect to FIG. 11.

Referring to FIG. 15 in conjunction with FIG. 3, the request for listing tool 68 may provide work flows to obtain buyer's input of information content for purposes of developing the data relationships as set forth in an exemplary RFL fields 300 for purposes of soliciting sellers to propose discrete traffic blocks for fulfillment of the buyer's campaign 136. The exemplary RFL fields 300 may comprise: i) an RFL option field 302 indicating whether the campaign is open for sellers to propose a discrete traffic block in response to the campaign 136; ii) a response due data 304 indicating when seller proposals are due; and iii) an open offer date 306 indicating for how long any seller proposal must remain open for buyer acceptance thereof.

The listing response tool 68 may provide work flows to obtain seller proposed discrete traffic blocks for fulfillment of the buyer's campaign 136. Discrete traffic blocks proposed by sellers may be in accordance with the data relationships of the exemplary RFL response table 310. Each record 312 of the RFL response table associates with a seller proposed discrete traffic block. The record includes: i) a seller ID field 313 identifying the seller—which may be the same seller global identifier as discussed with respect to field 86 of FIG. 7*b*; ii) an inventory ID field 314 which identifies the seller's segmented traffic by reference to a record 93 of the inventory table 92 of FIG. 7*b*; iii) a duration field 316 (comprising a start date 316*a* and an end date 316*b*) specifying the duration during which the seller is proposing to fulfill the buyer's request; iv) a volume filed 318 specifying the quantity impressions 318*a* or quantity of clicks 318*b* which the seller proposes to fulfill the buyer's request; and v) an acceptance/rejection field 320 which may be populated by workflows of the request for listing tool 58 (FIG. 3) indicating the buyer's acceptance or rejection of the proposal.

Figure 16:
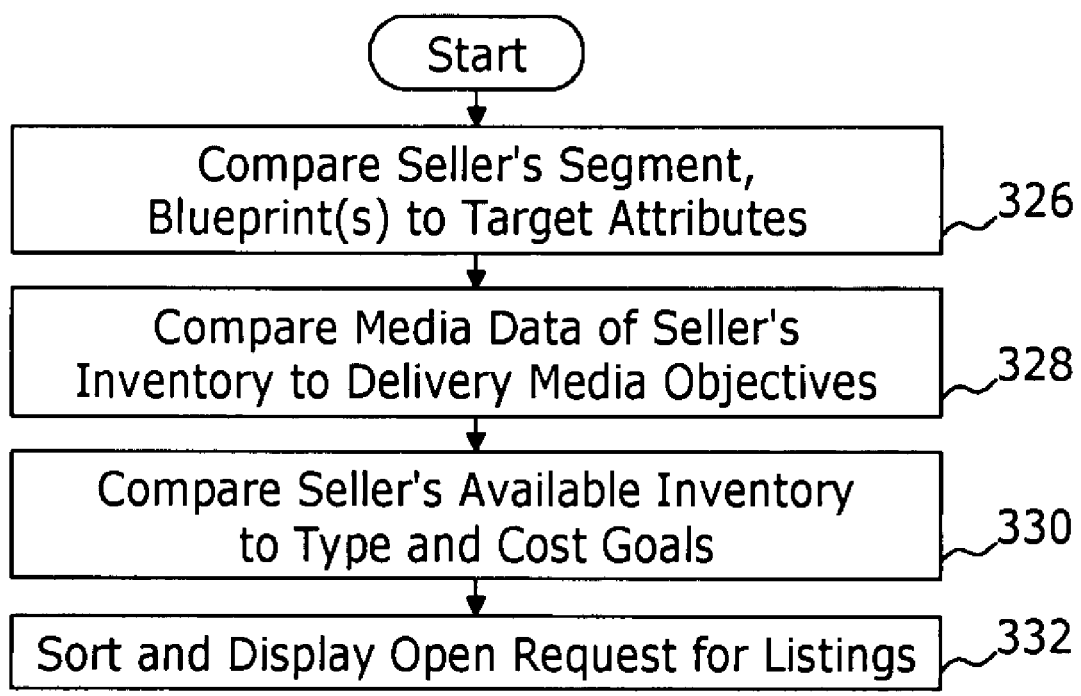
FIG. 16 is a flow chart representing exemplary steps for associating request for listings with a seller's segmented traffic in accordance with an embodiment of the present invention.

Turning briefly to FIG. 16, exemplary steps which may be performed by the listing response tool 68 for displaying campaigns with open requests for listings are shown. Step 326 represents comparing the seller's segment blue print(s) 86 (FIG. 7*b*) to target attributes 144 (FIG. 11) of those campaigns for which an open request for listing exists.

Step 328 represents comparing the delivery media data 89 (FIG. 7*b*) of the seller's inventory to delivery media objectives 145 (FIG. 11) of the campaigns for which open request for listings exists.

Step 330 represents comparing the seller's available inventory to the transaction type and cost goals of the campaigns for which there are open request for listings.

Step 332 represents sorting and displaying those open requests for listings which correspond to the seller's available inventory.

Turning to FIG. 17, an exemplary open RFL web page 336 displaying those campaigns for which an open request for listings exist that match the seller's inventory. The RFL web page 336 may include a listed summary 338 of such campaigns, a calculation of the degree of match 340, an indication of when a response is due 341, and controls 342 and 344 for requesting additional information about the campaign and/or controls for responding to the request for listing available to the seller, respectively.

Figure 18:
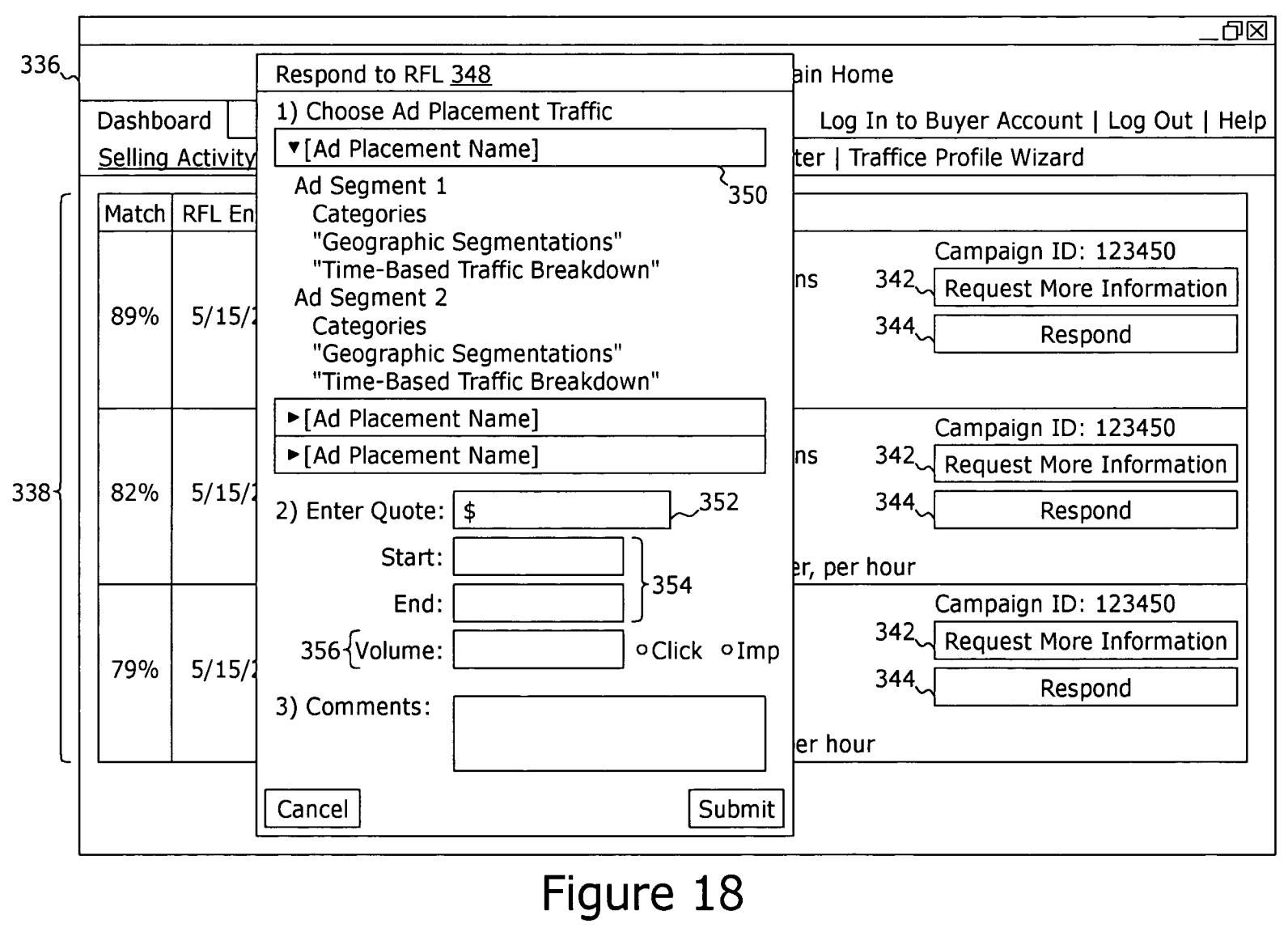

Upon selection of the control for responding to the listing, the RFL response tool 68 may generate a response pop up window 348 as represented in FIG. 18.

The response pop up window 348 may include controls for enabling the seller to define a discrete traffic block, including a price quote, for proposing to the buyer in response to the RFL. In more detail, the pop up window may include: i)

control 350 for obtaining seller selection of an available inventory segment/ad placement for proposal (e.g. a record 93 from the seller's inventory table 92 of FIG. 7*b*); ii) control 352 for obtaining seller price quote for the proposes discrete traffic block; iii) control(s) 354 for obtaining a duration of the proposed discrete traffic block; iv) control(s) 356 for obtaining the volume of impressions or clicks proposed in the discrete traffic block. Such data may fulfill the data relationships discussed with respect to the RFL response table 310 of FIG. 15.

Following seller submission of a proposed discrete traffic block, it remains available for buyer acceptance for the period specified by the buyer (e.g. until the open offer date 306 of FIG. 300). Upon acceptance by the buyer, the discrete traffic block may become an open order for fulfillment by the order management system 40 (FIG. 3).

Order Management System

Returning to FIG. 3 in conjunction with FIG. 1, the order management system 40 provides for serving advertising content 19 for each ad placement 12, 14, and 16 of a web page 13 in conjunction with the Seller's web server delivering the web page 13 to the end user's computer system for viewing.

Figure 19:
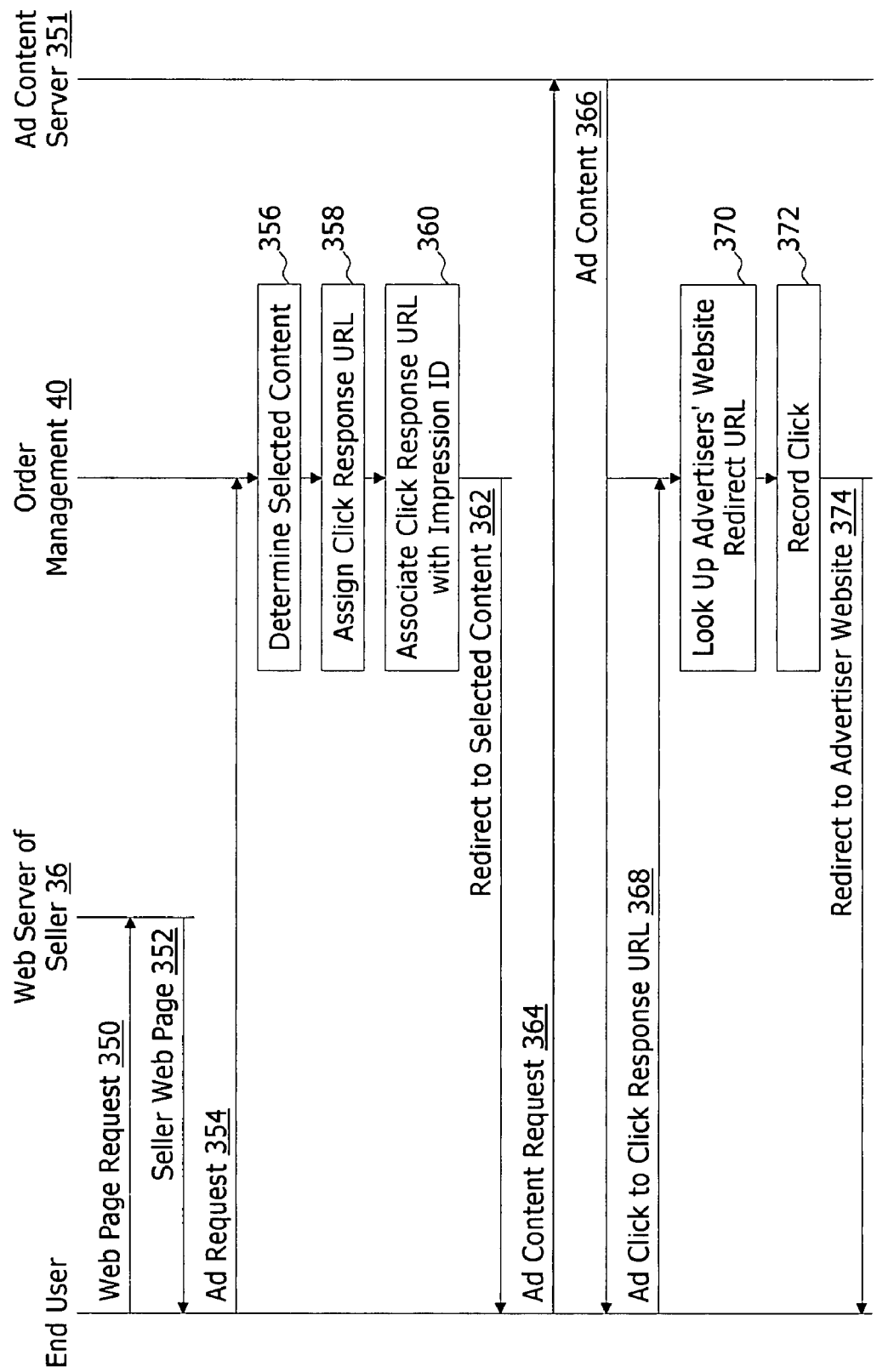
FIG. 19 is a ladder diagram representing exemplary steps performed for serving advertisement content in accordance with an embodiment of the present invention.

Turning to FIG. 19, a ladder diagram represents exemplary interaction between an end user system (e.g. a web browsers), a web server of the seller 36, the order management system 40, and an advertisement content server 351—which may be under common control with the order management system 40, the seller 36, or the buyer 34.

Step 350 represents the end user browser system generating an HTTP connection to the URL of the web server of the seller 36 for purposes of obtaining the seller's web page 13.

Step 352 represents the web server of the seller 36 serving the web page 13. Included within the ad placement within the seller's web page 13 is advertisement request script for driving the end user's browser to generate an advertisement request to the order management system to obtain an ad impression for rendering within the ad placement. The advertisement request script includes an identifier of the segmented ad placement. Further yet, appended to the advertisement request script may be end user attribute data dynamically generated by the seller's web server. For example, if the end user is a registered user, attribute data known about the end user may be appended to the advertisement request script.

Step 354 represents the end user browser generating an advertisement request to the order management system 40. The advertisement request may include identification of the segmented ad placement segment 93 (FIG. 7*b*) as well as end user attributes.

Step 356 represents the order management system 40 determining selected advertisement content for rendering to the end user as an advertisement impression within the ad placement within the web page content 13. A more detailed discussion of the order management system 40 determining selected advertisement content is included herein with respect to FIG. 20.

Step 358 represents assigning a unique click response URL to the advertisement impression. The unique click response URL includes a domain name associated with the order management system such that if the end user clicks on the advertisement impression, his/her browser is redirected to the click response URL such that the order management system can track end user response.

Step 360 represents associating a unique identification of the advertisement impression (or the open order with which the selected advertisement content is included) with the click response URL. This association may be recorded in an impression database such that when an end user clicks on the advertisement impression and is linked to the click response URL, such end user action may be associated with the open order associated with the advertisement content and the order management system can redirect the end user's browser to the advertiser's web page.

Step 362 represents returning, to the end user's browser, an advertisement request which includes the click response URL to associate with the advertisement impression and an advertisement request for purposes of instructing the end user browser to connect to a URL at which the selected advertisement content may be obtained (e.g. an ad server 351). Such URL may be associated with the order management system 40, the seller (for example if a fail over advertisement), the buyer (if the buyer is serving its own advertisement content), or an independent advertisement content server.

Step 364 represents the end user's browser connecting to the ad content server 351 for purposes of obtaining the selected advertisement content. This step may further include passing the click response URL to such ad content server 351 such that it may be associated with the advertisement content to be returned for rendering.

Step 366 represents the advertisement content server 351 returning the advertisement content (with the click response URL) to the end user's browser for rendering in the ad placement.

Step 368 represents the end user browser establishing a connection to the click response URL at the order management system 40 in response to the user clicking on the advertisement content.

Step 370 represents the order management system 40 looking up the URL of the advertiser's web site and step 372 represents recording the "click". Recording the click may comprise updated data related to fulfillment of the discrete traffic block, fulfillment of the advertisement campaign, and updating historical records associated with the effectively of the seller's segmented traffic 93 (FIG. 6) and the buyer's advertisement campaign and/or advertisement content.

Step 374 represents providing a redirect to the advertiser's web site such that the end user's browser may connect to the advertiser's website.

It should be appreciated that although the steps of FIG. 19 represent the end user browser obtaining advertisement content directly from the ad content server 351, those skilled in the art will recognize that the order management system 40 may obtain selected advertisement content from an ad contend server 351 and, in response to the ad request 354, return the selected advertisement content (with the click response URL) to the end user browser at step 362. Such embodiment would eliminate the need for steps 364 and 366, but create additional processing and connectivity burdens on the order management system 40.

Figure 20:
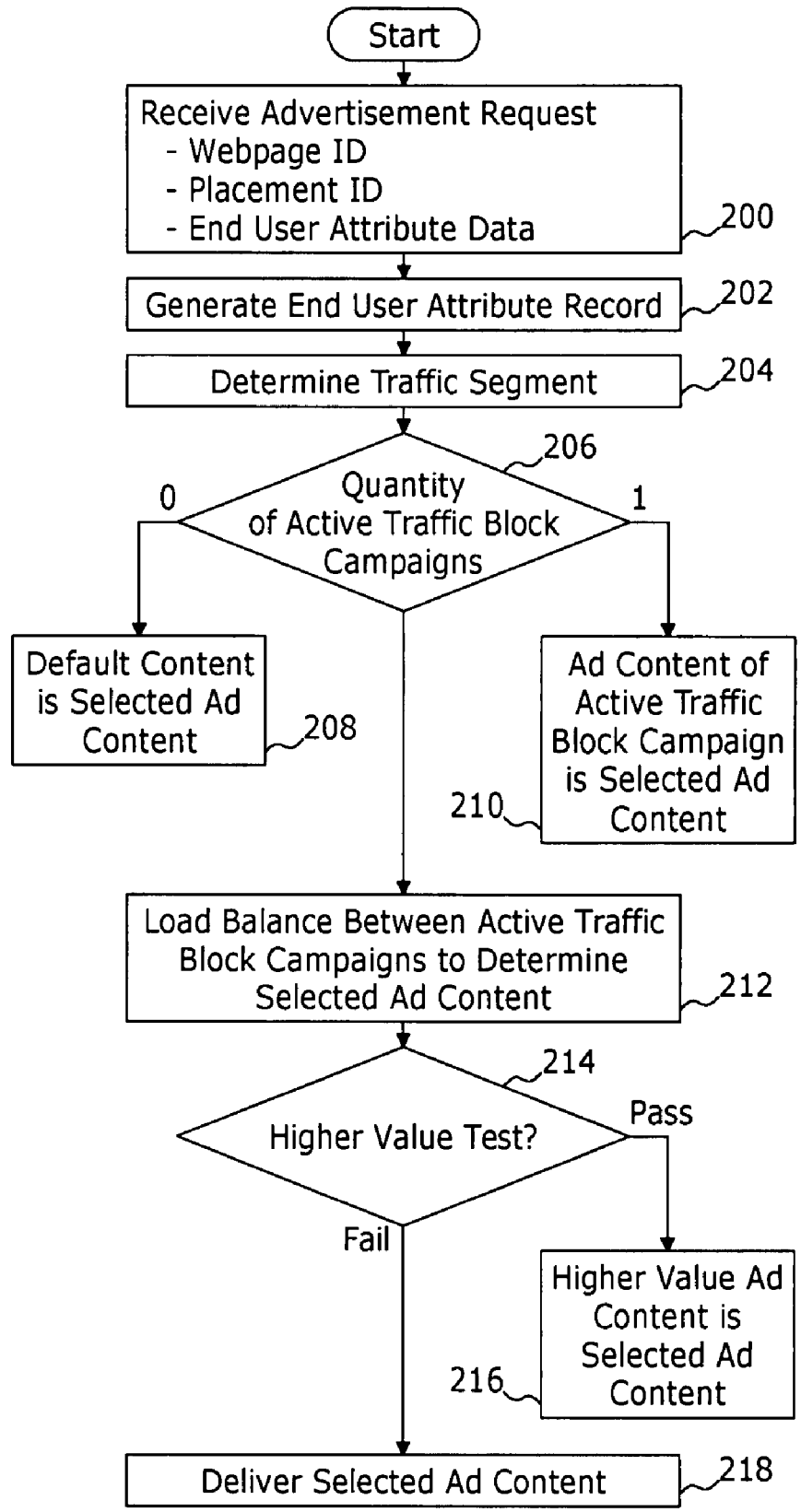
FIG. 20 is a flow chart representing exemplary steps performed by an order management system for selecting advertisement content for rendering in accordance with an embodiment of the present invention.

Turning to FIG. 20, a flow chart is shown which represents exemplary steps that may be performed for determining selected advertisement content for rendering within an ad placement 12, 14, or 16 of a seller's web page is shown.

Step 200 represents receiving an advertisement request. The advertisement request may include identification of the segmented ad placement and/or identification of the seller's web page, the ad placement, and end user attribute data. Additional end user attribute data may be obtained by determining the end user's IP address, reading a cookie on the end user's system, and or reading browser parameters from the end user system.

Step 202 represents generating an end user attribute record which may comprise mapping the end user attribute data into the attribute template of the ad placement within the web page.

Step 204 represents determining which of multiple traffic segments the end user best fits by comparing the end user attribute record to each segment of the segmented traffic. Such comparison may be by way of comparing, for each traffic segment, a bit register representing the end user attribute records to a bit register representing the traffic segment. The closest matching bit register represents the best fit segment. Ideally the match should be exact.

Step 206 represent determining the quantity of active traffic block campaigns (e.g. open orders) for the segment. If there are no open orders, default content, which may be recorded by the seller, becomes the selected advertisement content at step 208.

If there is only a single open order, the buyer's advertisement content becomes the selected content at step 210.

If there are multiple open orders, load balancing between the open orders is used to determine the selected advertisement content as represented by step 212.

For example, referring briefly again to FIG. 3, if, for a particular ad placement and segment (represented by a record of the inventory table 92) there are a total of three discrete traffic blocks have been sold to buyers and are active, the load balancing will be amongst the three traffic blocks.

In one embodiment, load balancing may comprise determining which open order is farthest behind (or least ahead) on its target pace. An order's target pace may be equal to the volume (e.g. the purchased quantity of impressions or clicks) divided by the time period over which the volume is to be delivered. An order is ahead of the target pace if its actual aggregate fulfillment volume (either clicks or impressions) is greater than a target volume. The target volume is the target pace multiplied by the number of days that have already elapsed since the start date of the period during which the volume is to be delivered. Similarly, an order is behind the target pace if the actual aggregate fulfillment volume is less than the target volume.

Figure 21:
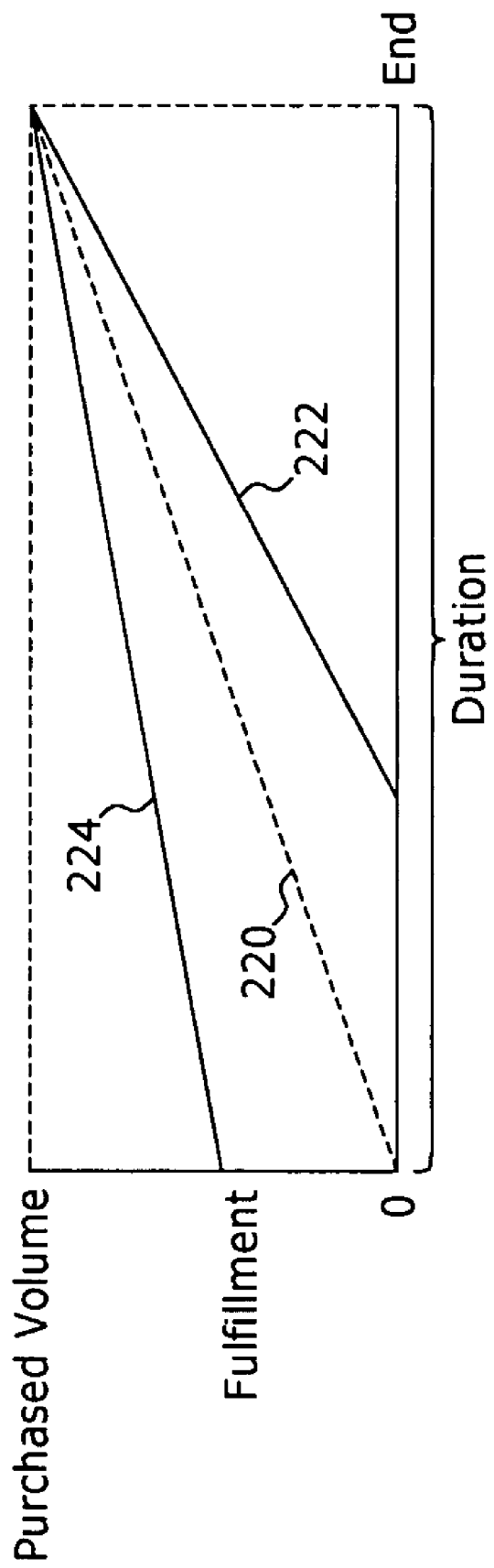
FIG. 21 is a diagram representing fulfillment pace thresholds in accordance with an embodiment of the present invention.

In a second embodiment, load balancing may comprise determining which open order is farthest behind a low fulfillment threshold (or least ahead of a high fulfillment threshold). Turning briefly to FIG. 21, target pace 220 of a particular traffic block campaign (e.g. the purchased volume divided by the duration) is represented by a graph with: i) a horizontal access representing time between the start time and end time of the duration of the discrete traffic block; and ii) a vertical access representing fulfillment between zero actual impressions/clicks and the purchased volume of impressions/clicks. As such, the target pace 220 is represented by a straight line from the vertex of the two axes and a coordinate representing full fulfillment of the purchased volume at the end date of the duration.

The low fulfillment threshold 222 represents a fulfillment pace less than the target pace—but approaching the target pace at the end of the duration. Similarly, the high fulfillment threshold 224 represents a fulfillment pace greater than the target pace—but approaching the target base at the end of the duration.

The range between the low fulfillment threshold 222 and the high fulfillment threshold 224 represent an acceptable deviation from the target pace—and such acceptable deviation becomes narrower, and approaches zero, at the end of the duration.

In this embodiment, an open order is behind the low fulfillment threshold if its actual fulfillment volume (at the particular time during the duration) is less than the low fulfillment threshold 222. Similarly, an open order is ahead of the high fulfillment threshold if its actual fulfillment volume (at the particular time during the duration) is greater than the high fulfillment threshold 224.

Returning to FIG. 20, after selecting the advertisement content based on load balancing between open orders (using either embodiment) at step 212—or after selecting advertisement content based on there being only one open order at step 210, the order management system 40 may perform a higher value test at step 214.

A higher value test enables the order management system 40 to override traditional load balancing between open orders and insert other advertisement content in situations where there is excess inventory (e.g. more impressions within the ad placement and segment than needed for fulfillment of open orders) and an opportunity to place advertisement content that is more likely to generate revenue than the advertisement content selected at steps 210 or 212 without putting any open order too far behind target pace.

One example of a higher value test comprises calculating eCPM for any advertisement content for which there is a bid as filler advertisement content—preferably using Yfao. If the eCPM is higher than eCPM for any of the open orders and all open orders are not below the low threshold, the higher value test may result in placement of the filler ad with the high eCPM value.

In the event that the higher value test fails, the selected advertisement content is delivered as represented by step 218. In the event that the higher value test is passed, the higher value advertisement content becomes the selected advertisement content that is delivered as represented by step 216. In either example, delivering the selected advertisement content may comprise directing the end user browser to the selected advertisement content as discussed with respect to FIG. 19.

Reporting Tools

Returning to FIG. 3, as discussed, the auction management system 10 may further include reporting tools 41 which provide workflows for executing buyer and/or seller defined queries against the data relationships discussed herein for purposes of accessing and evaluating historical data.

Exemplary reporting may include access historical transaction data by ad placement, individual listing and/or by seller in general with respect to (i) past winning bid prices (both for such individual buyer and all other buyers), (ii) fulfillment of open orders following the closing of an auction for a listing with a winning bid (both for such individual buyer and all other buyers), (iii) average CPM, CPC, CPL, CPA or other transactional unit winning bid prices per listing (both for such individual buyer and all other buyers), (iv) historical conversion data, including, among others, click-through rate (i.e., total click-throughs received per thousand impressions), acquisition rate (i.e., total sales or completion of other actions per thousand impressions), average value of a conversion (e.g., average dollar amount of a sale in a CPA transaction) (both for such individual buyer and all other buyers), and (v) relative comparisons of (i) through (iv) above among other sellers of similar listings (based on listing attributes provided by sellers at the time of creation of a listing). Further, an embodiment of the present invention will allow the additional sorting and narrowing of the historical transaction data available above by reference to either such individual buyer's campaign(s), or all buyers' campaigns that (i) are associated with a particular offering (e.g., performance of cell phone offers), (ii) have particular attributes associated with such buyer campaigns (e.g., performance of a seller with respect to women aged 18 to 34 years old), and/or (iii) are compared to an individual campaign created by a buyer.

Other historical transaction data with respect to buyers relating to (i) past winning bid prices, (ii) average CPM, CPC, CPL, CPA or other transactional unit winning bid prices per buyer creative ad unit or campaign, (iii) historical conversion data, including, among others, click-through rate, acquisition rate, average value of a conversion (both for individual buyers and all buyers in the aggregate), and (iv) relative comparisons of (i) through (iii) above among other buyers of similar listings (based on product or service offerings or the creative ad unit provided by buyers at the time of creation of a campaign). Further, an embodiment of the present invention will advantageously allow the additional sorting and narrowing of the historical transaction data available above by reference to either such individual buyer's campaign(s), or all buyers' campaigns, (i) associated with a particular offering (e.g., performance of cell phone offers), (ii) having particular attributes associated with such buyer campaigns (e.g., performance of a seller with respect to women aged 18 to 34 years old), and (iii) by comparison to an individual campaign created by a buyer.

Although the invention has been shown and described with respect to certain exemplary embodiments, it is obvious that equivalents and modifications will occur to others skilled in the art upon the reading and understanding of the specification. For example, the data relationships represented in various figures are exemplary only. Those skilled in the art will appreciate that database design for implementation may utilize other data relationships to achieve the objectives of the present invention. The present invention includes all such equivalents and modifications, and is limited only by the scope of the following claims.

What is claimed is:

1. A listing system for brokering, between a seller and a buyer, a discrete traffic block of an ad placement, the listing system comprising:
  a processor;
  a memory coupled to the processor, the memory designed to store a set of instructions to be executed by the processor, the set of instructions including:
    a request for listing tool providing web pages to a buyer for obtaining campaign parameters defining the buyer's request for listing, the campaign parameters comprising:
      at least one target traffic attribute defining at least one attribute of a target discrete traffic block in which the buyer desires buyer advertisement content to be rendered; and
      a target duration parameter defining a time period during which the buyer desires to have buyer advertisement content rendered;
    a listing response tool providing web pages to a seller for:
      displaying the campaign parameters of at least one open request for listing;
      obtaining traffic block parameters associated with a seller proposed discrete traffic block, the traffic block parameters comprising:
        a volume parameter defining the volume of traffic included in the discrete traffic block, wherein the volume of traffic defined by the volume parameter is a predetermined quantity of advertisement impressions displayed to end users;
        at least one duration parameter defining a time period during which the volume of traffic included in the discrete traffic block will be delivered;
      the request for listing tool further providing web pages to the buyer for:
        displaying the traffic block parameters associated with each proposed traffic block; and
        obtaining selection of at least one selected traffic block, the at least one selected traffic block being one of the proposed traffic blocks; and
    an order management system for directing placement of buyer advertisement content designated by the buyer within an ad placement of the at least one selected traffic block for the volume of traffic defined by the volume parameter and during the time period defined by the duration parameter, wherein the order management system further directs placement of filler advertisement content within the ad placement if placement of the advertising content designated by buyer is at a fulfillment pace that is ahead of a fulfillment pace threshold, and wherein:
      the fulfillment pace is the aggregate of advertisement impressions displayed to the end users; and
      the fulfillment pace threshold is a high fulfillment threshold, the high fulfillment threshold being:
        the total quantity of advertisement impressions included within the discrete block divided by the active time period of the discrete block and multiplied by the portion of the active time period that has elapsed, plus
        a predetermined high threshold value divided by the active time period of the discrete block and multiplied by an amount of time remaining before expiration of the active time period.

2. A listing system for brokering, between a seller and a buyer, a discrete traffic block of an ad placement, the listing system comprising:
  a processor;
  a memory coupled to the processor, the memory designed to store a set of instructions to be executed by the processor, the set of instructions including:
    a request for listing tool providing web pages to a buyer for obtaining campaign parameters defining the buyer's request for listing, the campaign parameters comprising:
      at least one target traffic attribute defining at least one attribute of a target discrete traffic block in which the buyer desires buyer advertisement content to be rendered; and
      a target duration parameter defining a time period during which the buyer desires to have buyer advertisement content rendered;
    a listing response tool providing web pages to a seller for:
      displaying the campaign parameters of at least one open request for listing;
      obtaining traffic block parameters associated with a seller proposed discrete traffic block, the traffic block parameters comprising:
        a volume parameter defining the volume of traffic included in the discrete traffic block; wherein the volume of traffic defined by the volume parameter is a predetermined quantity clicks and wherein a click represents an end user, to which an advertisement impression is displayed, selecting the advertisement impression for redirect to a web page designated by the buyer;

at least one duration parameter defining a time period during which the volume of traffic included in the discrete traffic block will be delivered;

the request for listing tool further providing web pages to the buyer for:
displaying the traffic block parameters associated with each proposed traffic block; and
obtaining selection of at least one selected traffic block, the at least one selected traffic block being one of the proposed traffic blocks; and an order management system for directing placement of buyer advertisement content designated by the buyer within an ad placement of the at least one selected traffic block for the volume of traffic defined by the volume parameter and during the time period defined by the duration parameter, wherein the order management system further directs placement of filler advertisement content within the ad placement if placement of buyer advertising content designated by the buyer is at a fulfillment pace that is ahead of a fulfillment pace threshold, wherein:
the fulfillment pace is the aggregate quantity of clicks; and
the fulfillment pace threshold is the total quantity of clicks included within the discrete block divided by the active time period of the discrete block and multiplied by the portion of the active time period that has elapsed.

3. A listing system for brokering, between a seller and a buyer, a discrete traffic block of an ad placement, the listing system comprising:
a processor;
a memory coupled to the processor, the memory designed to store a set of instructions to be executed by the processor, the set of instructions including:
a request for listing tool providing web pages to a buyer for obtaining campaign parameters defining the buyer's request for listing, the campaign parameters comprising:
at least one target traffic attribute defining at least one attribute of a target discrete traffic block in which the buyer desires buyer advertisement content to be rendered; and
a target duration parameter defining a time period during which the buyer desires to have buyer advertisement content rendered;
a listing response tool providing web pages to a seller for:
displaying the campaign parameters of at least one open request for listing;
obtaining traffic block parameters associated with a seller proposed discrete traffic block, the traffic block parameters comprising:
a volume parameter defining the volume of traffic included in the discrete traffic block; wherein the volume of traffic defined by the volume parameter is a predetermined quantity clicks and wherein a click represents an end user, to which an advertisement impression is displayed, selecting the advertisement impression for redirect to a web page designated by the buyer;
at least one duration parameter defining a time period during which the volume of traffic included in the discrete traffic block will be delivered;

the request for listing tool further providing web pages to the buyer for:
displaying the traffic block parameters associated with each proposed traffic block; and
obtaining selection of at least one selected traffic block, the at least one selected traffic block being one of the proposed traffic blocks; and an order management system for directing placement of buyer advertisement content designated by the buyer within an ad placement of the at least one selected traffic block for the volume of traffic defined by the volume parameter and during the time period defined by the duration parameter, wherein the order management system further directs placement of filler advertisement content within the ad placement if placement of buyer advertising content designated by the buyer is at a fulfillment pace that is ahead of a fulfillment pace threshold, wherein:
the fulfillment pace is the aggregate of clicks; and
the fulfillment pace threshold is a high fulfillment threshold, the high fulfillment threshold being:
the total quantity of clicks included within the discrete block divided by the active time period of the discrete block and multiplied by the portion of the active time period that has elapsed, plus
a predetermined high threshold value divided by the active time period of the discrete block and multiplied by an amount of time remaining before expiration of the active time period.

4. A listing system for brokering, between a seller and a buyer, a discrete traffic block of an ad placement, the listing system comprising:
a processor;
a memory coupled to the processor, the memory designed to store a set of instructions to be executed by the processor, the set of instructions including:
a request for listing tool providing web pages to a buyer for obtaining campaign parameters defining the buyer's request for listing, the campaign parameters comprising:
at least one target traffic attribute defining at least one attribute of a target discrete traffic block in which the buyer desires buyer advertisement content to be rendered; and
a target duration parameter defining a time period during which the buyer desires to have buyer advertisement content rendered;
a listing response tool providing web pages to a seller for:
displaying the campaign parameters of at least one open request for listing;
obtaining traffic block parameters associated with a seller proposed discrete traffic block, the traffic block parameters comprising:
a volume parameter defining the volume of traffic included in the discrete traffic block;
at least one duration parameter defining a time period during which the volume of traffic included in the discrete traffic block will be delivered;

the request for listing tool further providing web pages to the buyer for:
displaying the traffic block parameters associated with each proposed traffic block; and
obtaining selection of at least one selected traffic block, the at least one selected traffic block being one of the proposed traffic blocks; and an order management system for directing placement of buyer advertisement content designated by the buyer within an ad placement of the at least one selected traffic block for the volume of traffic defined by the volume parameter and during the time period defined by the duration parameter, wherein at least two discrete traffic blocks may include concurrent active time periods, and the order management system directs placement of buyer advertisement content within the ad placement for the discrete traffic block that is most behind a fulfillment pace threshold, and wherein, for each of the at least two discrete traffic blocks:

the fulfillment pace for the discrete traffic block is the aggregate of volume fulfilled; and the fulfillment pace threshold for the discrete traffic block is the total volume of traffic included in the discrete traffic block divided by the active time period of the discrete traffic block and multiplied by the portion of the active time period that has elapsed.

5. A listing system for brokering, between a seller and a buyer, a discrete traffic block of an ad placement, the listing system comprising:

a processor;

a memory coupled to the processor, the memory designed to store a set of instructions to be executed by the processor, the set of instructions including:

a request for listing tool providing web pages to a buyer for obtaining campaign parameters defining the buyer's request for listing, the campaign parameters comprising:

at least one target traffic attribute defining at least one attribute of a target discrete traffic block in which the buyer desires buyer advertisement content to be rendered; and a target duration parameter defining a time period during which the buyer desires to have buyer advertisement content rendered;

a listing response tool providing web pages to a seller for:

displaying the campaign parameters of at least one open request for listing;

obtaining traffic block parameters associated with a seller proposed discrete traffic block, the traffic block parameters comprising:

a volume parameter defining the volume of traffic included in the discrete traffic block;

at least one duration parameter defining a time period during which the volume of traffic included in the discrete traffic block will be delivered;

the request for listing tool further providing web pages to the buyer for:

displaying the traffic block parameters associated with each proposed traffic block; and obtaining selection of at least one selected traffic block, the at least one selected traffic block being one of the proposed traffic blocks; and an order management system for directing placement of buyer advertisement content designated by the buyer within an ad placement of the at least one selected traffic block for the volume of traffic defined by the volume parameter and during the time period defined by the duration parameter, wherein at least two discrete traffic blocks may include concurrent active time periods, and the order management system directs placement of buyer advertisement content within the ad placement for the discrete traffic block that is most behind a fulfillment pace threshold, and wherein, for each of the at least two discrete traffic blocks:

the fulfillment pace for the discrete traffic block is the aggregate of volume fulfilled; and the fulfillment pace threshold is a low fulfillment threshold, the low fulfillment threshold being:

the total volume included within the discrete block divided by the active time period of the discrete block and multiplied by the portion of the active time period that has elapsed, less a predetermined low threshold value divided by the active time period of the discrete block and multiplied by an amount of time remaining before expiration of the active time period.

6. A listing system for brokering, between a seller and a buyer, a discrete traffic block of an ad placement, the listing system comprising:

a processor;

a memory coupled to the processor, the memory designed to store a set of instructions to be executed by the processor, the set of instructions including:

a request for listing tool providing web pages to a buyer for obtaining campaign parameters defining the buyer's request for listing, the campaign parameters comprising:

at least one target traffic attribute defining at least one attribute of a target discrete traffic block in which the buyer desires buyer advertisement content to be rendered; and a target duration parameter defining a time period during which the buyer desires to have buyer advertisement content rendered;

a listing response tool providing web pages to a seller for:

displaying the campaign parameters of at least one open request for listing;

obtaining traffic block parameters associated with a seller proposed discrete traffic block, the traffic block parameters comprising:

a volume parameter defining the volume of traffic included in the discrete traffic block;

at least one duration parameter defining a time period during which the volume of traffic included in the discrete traffic block will be delivered;

the request for listing tool further providing web pages to the buyer for:

displaying the traffic block parameters associated with each proposed traffic block; and obtaining selection of at least one selected traffic block, the at least one selected traffic block being one of the proposed traffic blocks; and an order management system for directing placement of buyer advertisement content designated by the buyer within an ad placement of the at least one selected traffic block for the volume of traffic defined by the volume parameter and during the time period defined by the duration parameter, wherein the traffic block parameters further comprise a buyer group parameter, the buyer group parameter defining a plurality of private buyers, and the listing search tool includes the discrete traffic block within the display of active traffic blocks only if the buyer is one of the plurality of private buyers, and wherein the expected number of impressions required to provide the predetermined quantity of clicks comprises the predetermined quantity of clicks divided by a yield factor, the yield factor comprising a value calculated by dividing a historical quantity of clicks on the advertisement content over a predetermined period of time by the quantity of impressions of the advertisement content over the predetermined period of time.

7. A listing system for brokering, between a seller and a buyer, a discrete traffic block of an ad placement, the listing system comprising:

a processor;

a memory coupled to the processor, the memory designed to store a set of instructions to be executed by the processor, the set of instructions including:

a request for listing tool providing web pages to a buyer for obtaining campaign parameters defining the buyer's request for listing, the campaign parameters comprising:

at least one target traffic attribute defining at least one attribute of a target discrete traffic block in which the buyer desires buyer advertisement content to be rendered; and a target duration parameter defining a time period during which the buyer desires to have buyer advertisement content rendered;

a listing response tool providing web pages to a seller for:

displaying the campaign parameters of at least one open request for listing;

obtaining traffic block parameters associated with a seller proposed discrete traffic block, the traffic block parameters comprising:

a volume parameter defining the volume of traffic included in the discrete traffic block;

at least one duration parameter defining a time period during which the volume of traffic included in the discrete traffic block will be delivered;

the request for listing tool further providing web pages to the buyer for:

displaying the traffic block parameters associated with each proposed traffic block; and obtaining selection of at least one selected traffic block, the at least one selected traffic block being one of the proposed traffic blocks; and an order management system for directing placement of buyer advertisement content designated by the buyer within an ad placement of the at least one selected traffic block for the volume of traffic defined by the volume parameter and during the time period defined by the duration parameter, wherein the traffic block parameters further comprise a buyer group parameter, the buyer group parameter defining a plurality of private buyers, and the listing search tool includes the discrete traffic block within the display of active traffic blocks only if the buyer is one of the plurality of private buyers, and wherein the expected number of impressions required to provide the predetermined quantity of clicks comprises the predetermined quantity of clicks divided by a yield factor, the yield factor comprising a value calculated by dividing a historical quantity of clicks on the advertisement content within the discrete traffic block over a predetermined period of time by the quantity of impressions of the advertisement content within the discrete traffic block over the predetermined period of time.

* * * * *